US008726397B2

(12) United States Patent
Shibata et al.

(10) Patent No.: US 8,726,397 B2
(45) Date of Patent: May 13, 2014

(54) CONTENT RECEIVER, CONTENT UTILIZATION SYSTEM, VIEWING TIME LIMIT DETERMINATION METHOD, PROGRAM, AND RECORDING MEDIUM

(75) Inventors: Ken-ichi Shibata, Osaka (JP); Takuya Nishimura, Osaka (JP)

(73) Assignee: Panasonic Corporation, Osaka (JP)

( * ) Notice: Subject to any disclaimer, the term of this patent is extended or adjusted under 35 U.S.C. 154(b) by 472 days.

(21) Appl. No.: 13/123,994

(22) PCT Filed: Nov. 17, 2010

(86) PCT No.: PCT/JP2010/006749
§ 371 (c)(1),
(2), (4) Date: Apr. 13, 2011

(87) PCT Pub. No.: WO2011/145157
PCT Pub. Date: Nov. 24, 2011

(65) Prior Publication Data
US 2011/0289594 A1  Nov. 24, 2011

(30) Foreign Application Priority Data

May 20, 2010  (JP) ................................ 2010-115951

(51) Int. Cl.
*G06F 21/00* (2013.01)
(52) U.S. Cl.
USPC .................. 726/26; 705/52; 705/54; 705/57; 726/31
(58) Field of Classification Search
None
See application file for complete search history.

(56) References Cited

U.S. PATENT DOCUMENTS

| 2005/0149340 | A1 | 7/2005 | Murakami et al. |
| 2006/0031222 | A1 | 2/2006 | Hannsmann |
| 2007/0265977 | A1 | 11/2007 | Read |
| 2007/0271184 | A1 | 11/2007 | Niebert et al. |
| 2008/0065552 | A1 | 3/2008 | Elazar et al. |
| 2009/0024521 | A1* | 1/2009 | Lim ................................ 705/40 |
| 2010/0146283 | A1* | 6/2010 | Poitier et al. .................. 713/176 |
| 2011/0110516 | A1* | 5/2011 | Satoh ............................ 380/201 |

FOREIGN PATENT DOCUMENTS

| JP | 2004-227282 | 8/2004 |
| JP | 2006-510975 | 3/2006 |
| JP | 2008-252200 | 10/2008 |
| JP | 2009-38510 | 2/2009 |
| JP | 2010-113607 | 5/2010 |

OTHER PUBLICATIONS

International Search Report issued Dec. 14, 2010 in corresponding International Application No. PCT/JP2010/006749.

* cited by examiner

*Primary Examiner* — Jung Kim
*Assistant Examiner* — Ghodrat Jamshidi
(74) *Attorney, Agent, or Firm* — Wenderoth, Lind & Ponack, L.L.P.

(57) ABSTRACT

When a control unit of a content receiver causes to write out content to an exchangeable medium, causes to also write out a viewing license of the content to the exchangeable medium, and further causes an invalidating/validating unit to invalidate a viewing license of related content belonging to a same predetermined content group as the content if a viewing time limit of the content is not determined. When a content reproducer reproduces the content recorded in the exchangeable medium, determines the viewing time limit of the content and records it to the exchangeable medium. When the exchangeable medium which is reproduced by the content reproducer is installed, the control unit causes to set a viewing time limit of the related content to the same time limit as the viewing time limit of the content on the exchangeable medium and causes to validate the viewing license of the related content.

14 Claims, 15 Drawing Sheets

| | | |
|---|---|---|
| 713 | LICENSE TYPE | 0x10 |
| 705 | CONTENT ID | 0x1242A4 |
| 714 | PACK ID | 0x1812 |
| 702 | DECRYPTION KEY | 0xABCDCBA |
| 703 | VIEWING TERM | (N.A.) |
| 704 | VIEWING TIME LIMIT START | 2010/1/31/12:00 |
| | VIEWING TIME LIMIT END | 2010/2/1/12:00 |

| | | |
|---|---|---|
| 713 | LICENSE TYPE | 0x11 |
| 705 | CONTENT ID | 0x1242A4 |
| 714 | PACK ID | 0x1812 |
| 702 | DECRYPTION KEY | 0xABCDCBA |
| 703 | VIEWING TERM | 48 HOURS |
| 704 | VIEWING TIME LIMIT START | (N.A.) |
| | VIEWING TIME LIMIT END | (N.A.) |

| | | |
|---|---|---|
| 713 | LICENSE TYPE | 0x12 |
| 705 | CONTENT ID | 0x1242A4 |
| 714 | PACK ID | 0x1812 |
| 702 | DECRYPTION KEY | 0xABCDCBA |
| 703 | VIEWING TERM | (N.A.) |
| 704 | VIEWING TIME LIMIT START | 2010/1/31/12:00 |
| | VIEWING TIME LIMIT END | 2010/2/1/12:00 |
| 711 | MEDIA TYPE | SD CARD |

| | | |
|---|---|---|
| 713 | LICENSE TYPE | 0x13 |
| 705 | CONTENT ID | 0x1242A4 |
| 714 | PACK ID | 0x1812 |
| 702 | DECRYPTION KEY | 0xABCDCBA |
| 703 | VIEWING TERM | 48 HOURS |
| 704 | VIEWING TIME LIMIT START | (N.A.) |
| | VIEWING TIME LIMIT END | (N.A.) |
| 711 | MEDIA TYPE | SD CARD |

Fig.3
800

| # | CONTENT ID | PACK ID | DECRYPTION KEY | VIEWING TERM | VIEWING TIME LIMIT START | VIEWING TIME LIMIT END | VALID/INVALID FLAG |
|---|---|---|---|---|---|---|---|
| | 705 | 714 | 702 | 703 | 704 | | 808 |
| 1 | 0x121123 | (N.A.) | ABCA3AF | (N.A.) | 2010/1/31/12:00 | 2010/2/1/12:00 | VALID |
| 2 | 0x8A3BC1 | 0xABA8 | F83AD4E | 48 HOURS | (N.A.) | (N.A.) | VALID |
| 3 | 0xAAF1AB | 0x123A | 4E89AC | (N.A.) | 2010/2/3/12:00 | 2010/2/5/12:00 | VALID |
| 4 | 0X1893AB | 0xABA8 | 29A8CBF | 48 HOURS | (N.A.) | (N.A.) | VALID |
| .. | .. | .. | .. | .. | .. | .. | .. |

Fig.4
801

| # | CONTENT ID | PACK ID | DECRYPTION KEY | VIEWING TERM | VIEWING TIME LIMIT START | VIEWING TIME LIMIT END |
|---|---|---|---|---|---|---|
| | 705 | 714 | 702 | 703 | 704 | |
| 1 | 0x121123 | (N.A.) | ABCA3AF | (N.A.) | 2010/1/31/12:00 | 2010/2/1/12:00 |
| 2 | 0x8A3BC1 | 0xABA8 | F83AD4E | 48 HOURS | (N.A.) | (N.A.) |
| 3 | 0xAAF1AB | 0x123A | 4E89AC | (N.A.) | 2010/2/3/12:00 | 2010/2/5/12:00 |
| 4 | 0X1893AB | 0xABA8 | 29A8CBF | 48 HOURS | (N.A.) | (N.A.) |
| .. | .. | .. | .. | .. | .. | .. |

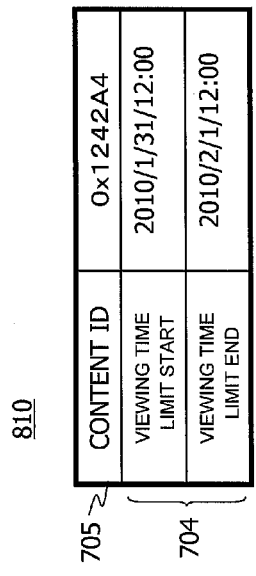
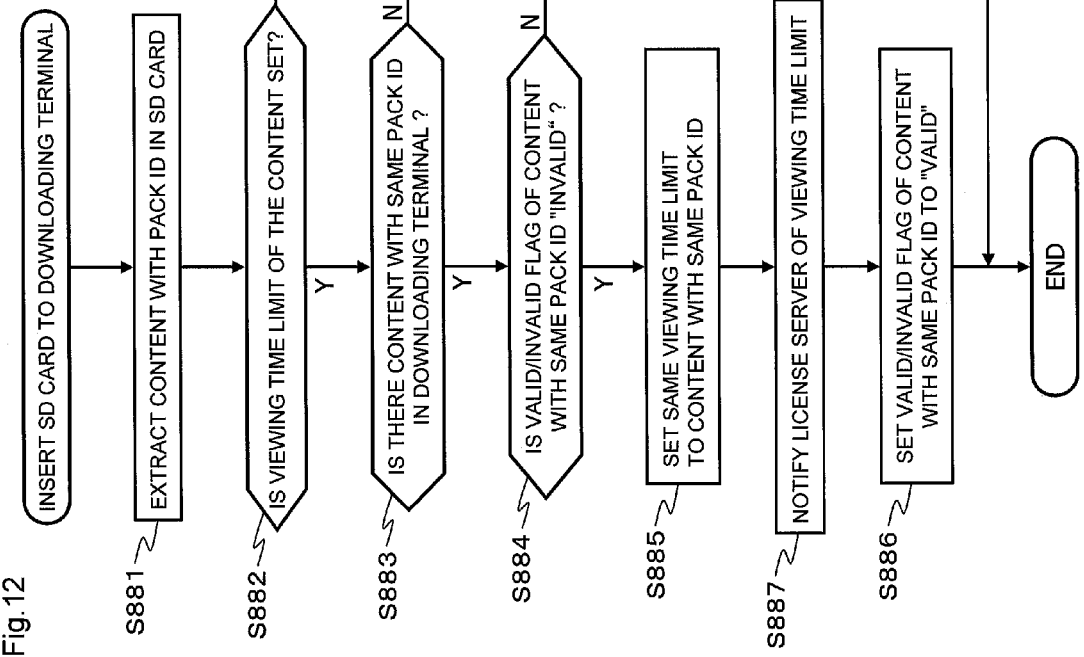

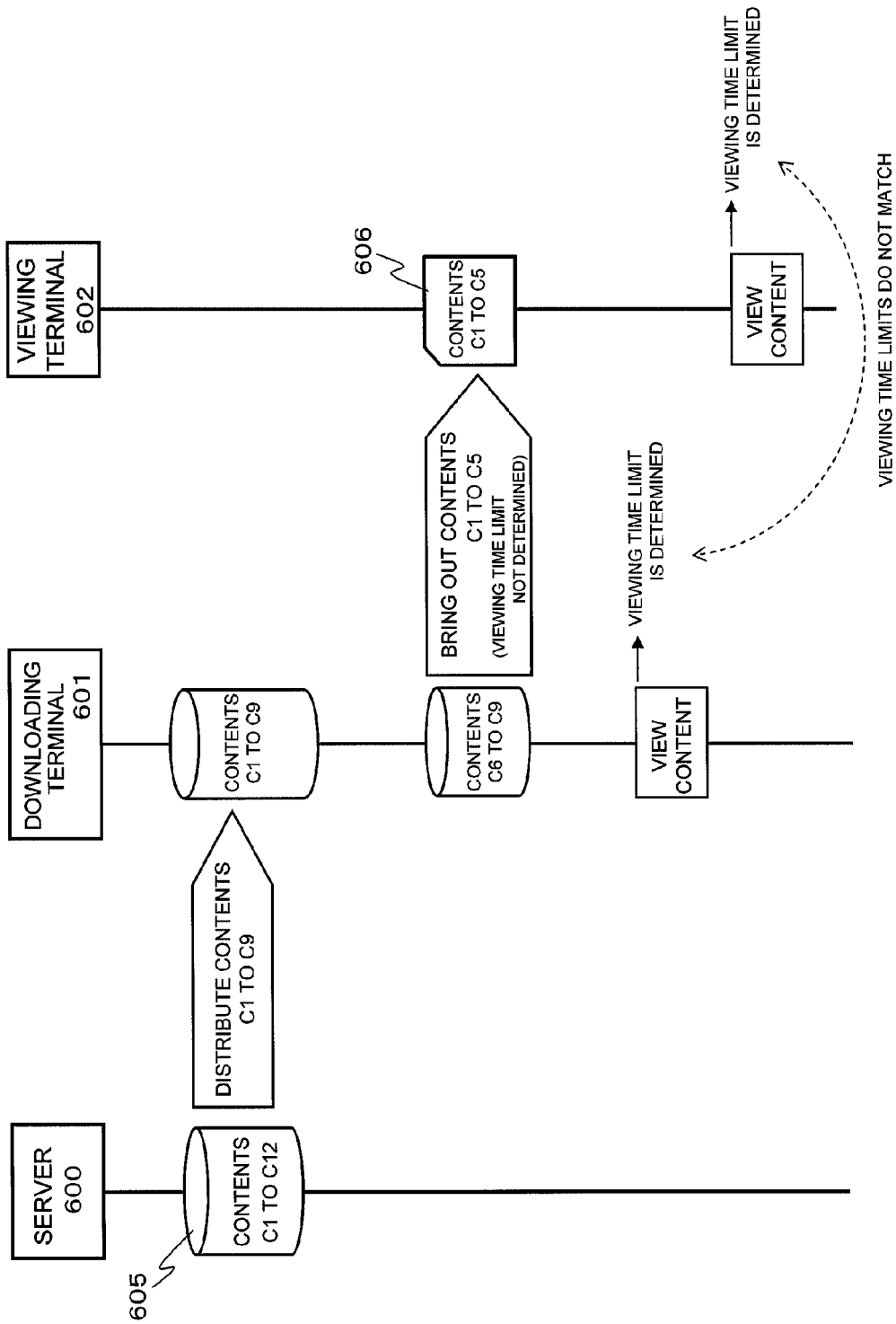

CONTENT RECEIVER, CONTENT UTILIZATION SYSTEM, VIEWING TIME LIMIT DETERMINATION METHOD, PROGRAM, AND RECORDING MEDIUM

CROSS-REFERENCE TO RELATED APPLICATIONS

This application is a U.S. national phase application of PCT International Patent Application No. PCT/JP2010/006749 filed Nov. 17, 2010, claiming the benefit of priority of Japanese Patent Application No. 2010-115951 filed May 20, 2010, all of which are incorporated by reference herein in their entirety.

TECHNICAL FIELD

The present invention relates to a content receiver, a content utilization system, a viewing time limit determination method, and the like for copying and bringing out encoded content with managed viewing time limit from a content receiver to an exchangeable medium and for reproducing the encoded content by a reproducer.

BACKGROUND ART

In recent years, techniques for downloading and reproducing movies, music, and the like are generalized along with the development of the Internet. Servers that distribute content, such as movies and music, provide a large number of services for downloading the content to PCs, AV devices, cell phones, and portable devices through a network.

Forms of the content distribution services include sell-off type content selling that allows the user to permanently view the purchased content and rental selling that allows the user to view the downloaded content within a limited viewing time.

In the typical download-type rental selling, a content provider that supplies content operates a content server and a DRM server, and a content receiver of a viewer downloads encoded rental content from the content server and acquires a decryption key of the encoded content and viewing conditions of the content from the DRM server. The viewing conditions of the content include information of the viewing time limit for viewing the content, a duplication condition of content, and the like.

In the reproduction of the rental content, the content receiver references the viewing time limit designated by the DRM server to start reproducing the content if the viewing time limit is not over and deletes the content if the viewing time limit is over.

The content receiver writes out the rental content and the viewing time limit to an exchangeable medium, such as an SD card, in some cases. In that case, the reproduction terminal of the SD card inspects the viewing time limit of the content when the rental content is about to be reproduced or when the reproduction is finished and deletes the content if the viewing time limit is over. An example of this type of reproduction method of content with viewing time limit includes a method described in Japanese Patent Laid-Open No. 2004-227282.

FIG. 17 is a sequence diagram for a terminal that has downloaded content from a server to move the content to view the content in another terminal in conventional content downloading as described in Japanese Patent Laid-Open No. 2004-227282.

A downloading terminal 601 can view content by storing the content distributed from a server 600 and acquiring a viewing license of the content from the server 600.

To view the content in another viewing terminal 602, the content can be moved from the downloading terminal 601 to the viewing terminal 602. However, the server 600 manages the viewing license in association with the downloading terminal 601. Therefore, the viewing terminal 602 that is another terminal acquires the viewing license again from the server 600 to view the content in the viewing terminal 602.

Forms of providing the viewing license include a viewing license with viewing time limit for providing a reproduction permission condition of the target content by designating absolute date and time and a viewing license with viewing term in which absolute date and time is not designated when the license is provided and only a viewable period, such as 48 hours, is designated to determine the viewing time limit upon the initial viewing on the terminal.

If the content is provided with the viewing license with viewing term, the terminal that reproduces the content does not acquire the viewing license from the server 600 again. The terminal itself determines and sets, for example, the date and time after 48 hours from the start of the initial reproduction of the content as the viewing time limit of the content.

An example of a form of selling the rental content includes a form called pack selling. The pack selling is a form of renting, for example, all twelve episodes of drama as one content group, or as a package, to provide twelve episodes at a lower price than when the episodes are individually purchased.

In this case, the price of the service paid by the user to the service provider is low. Instead, the viewing time limits of the entire pack contents are usually unified. Specifically, the viewing time limits of all twelve contents are set to the same date and time when viewing of any one of the contents is started after the download of twelve contents.

SUMMARY OF INVENTION

Technical Problem

However, in the conventional technique, there is a problem that the viewing time limits of contents cannot be unified between a terminal that has written out the contents and a portable terminal when an attempt is made to write out the rental content without a determined viewing time limit (rental content provided with viewing license with viewing term) to an exchangeable medium, such as an SD card, to view the content in the portable terminal and the like.

The problem will be described below.

For example, when a downloading terminal writes out some of the rental contents sold in pack to an exchangeable medium, such as an SD card to view the content in a portable terminal or the like, the viewing time limit needs to be synchronous with the content left (not written out) in the downloading terminal.

If one of the rental contents sold in pack is already viewed on the downloading terminal, the viewing time limit of the pack is determined. Therefore, the synchronization state can be secured if the viewing time limit is inherited when the content is written out to the exchangeable medium. On the other hand, if some of the rental contents are written out to the exchangeable medium when none of the rental contents in the pack is viewed, the rental contents that need to share the viewing time limit are saved in physically separated storage media. Therefore, the viewing time limits are individually set at initial views, and the viewing time limits cannot be synchronized.

FIG. 18 is a sequence diagram, in which the downloading terminal 601 that has received the pack rental content from the server 600 writes out some of the contents of the pack to an SD card 606 and the viewing terminal 602 attempts to view the content on the SD card 606.

An HDD 605 of the server 600 stores twelve contents with content numbers C1 to C12 in a pack. A case in which the downloading terminal 601 downloads nine contents of C1 to C9 among twelve contents and moves five contents C1 to C5 to the SD card 606 will be considered.

If none of the contents of C1 to C9 is viewed in the downloading terminal 601 before the contents are written out to the SD card 606, the viewing time limits of all contents of C1 to C12 are not determined, and for example, a viewing term, such as the contents can be viewed 48 hours from initial viewing, is designated. If the contents of C1 to C5 are written out to the SD card 606 in this state, the contents that need to share the viewing time limit separately exist on the SD card 606 and the downloading terminal 601.

In this way, if one of the contents of C6 to C9 left on the downloading terminal 601 is viewed in the downloading terminal 601 after the movement of the contents of C1 to C5 to the SD card 606, the viewing time limits of all contents of C1 to C12 need to be determined in synchronous with the content. However, the contents C1 to C5 brought out by the SD card 606 are under the management of the viewing terminal 602, and there is no means that the downloading terminal 601 can determine the viewing time limits of the contents C1 to C5. There is also no means that the downloading terminal 601 can determine the viewing time limits of the contents of C10 to C12 that are not yet downloaded to the downloading terminal 601. Furthermore, even if one of the contents C1 to C5 is viewed in the viewing terminal 602, there is no means that determines the viewing time limits of the contents C6 to C9 on the downloading terminal 601 and of the contents C10 to C12 that are not downloaded yet.

The problem occurs not only for the pack content, but also in a case of one content when the content is copied and written out to an exchangeable medium, such as the SD card 606, while the content is left in the downloading terminal 601. More specifically, if a copy of content without a determined viewing time limit is written out to the SD card 606, the viewing time limit of the content left in the downloading terminal 601 is determined when the content is reproduced by the downloading terminal 601, while the viewing time limit of the content written out to the SD card 606 is determined when the content is reproduced by the viewing terminal 602. Therefore, different viewing time limits are set for one content.

In consideration of the conventional problems, an object of the present invention is to provide a content receiver, a content utilization system, a viewing time limit determination method, and the like capable of synchronizing viewing time limits of a plurality of contents even if some of the plurality of contents that need to have the same viewing time limits are written out to an exchangeable medium before the viewing time limits are determined.

SUMMARY OF THE INVENTION

The $1^{st}$ aspect of the present invention is a content receiver that receives content, of which a viewing time limit is managed, from a content server and that writes out the content to an exchangeable medium, the content receiver comprising:
a license invalidating/validating unit that invalidates and validates a viewing license; an exchangeable medium reading/writing unit that writes out the content and the viewing license of the content to the exchangeable medium and that reads at least the viewing license written in the exchangeable medium; a viewing time limit setting unit that sets a viewing time limit; and a control unit, wherein when the control unit causes the exchangeable medium reading/writing unit to write out the content to the exchangeable medium before the content is reproduced, the control unit causes the exchangeable medium reading/writing unit to also write out the viewing license of the content to the exchangeable medium, and further causes the license invalidating/validating unit to invalidate a viewing license of related content belonging to a same predetermined content group as the content if the viewing time limit of the content is not determined, and when the exchangeable medium recording the viewing license of the content, which is provided with the viewing time limit which is determined by a reproducer's reproducing of the content written out to the exchangeable medium, is installed, the control unit causes the viewing time limit setting unit to set a viewing time limit of the related content to the same time limit as the viewing time limit of the content and causes the license invalidating/validating unit to validate the viewing license of the related content.

The $2^{nd}$ aspect of the present invention is the content receiver according to the $1^{st}$ aspect of the present invention, further comprising
a transmission/reception unit that transmits and receives data to and from a license server that supplies the viewing license, wherein
the control unit causes the transmission/reception unit to notify the license server of the set viewing time limit when the viewing time limit setting unit sets the viewing time limit of the related content.

The $3^{rd}$ aspect of the present invention is the content receiver according to the $2^{nd}$ aspect of the present invention, wherein
the control unit causes the transmission/reception unit to notify the license server of the set viewing time limit only if there is content belonging to the predetermined content group, that is not yet downloaded from the content server.

The $4^{th}$ aspect of the present invention is the content receiver according to the $1^{st}$ aspect of the present invention, wherein
when the related content is reproduced while the exchangeable medium recording the viewing license of the content without a determined viewing time limit is installed, the control unit causes the license invalidating/validating unit to validate the viewing license of the related content and causes the viewing time limit setting unit to determine the viewing time limit of the related content and to set the viewing time limit of the content recorded in the exchangeable medium to the same time limit as the determined viewing time limit of the related content.

The $5^{th}$ aspect of the present invention is the content receiver according to the $1^{st}$ aspect of the present invention, wherein
the invalidation of the viewing license of the related content without a determined viewing time limit by the license invalidating/validating unit, denotes discard of the viewing license of the related content, and
the license invalidating/validating unit acquires the viewing license of the related content again from the license server when the control unit validates the discarded viewing license of the related content.

The $6^{th}$ aspect of the present invention is a content utilization system comprising: a content receiver that receives content, of which a viewing time limit is managed, from a content server and that writes out the content to an exchangeable medium; and a content reproducer that reproduces the content recorded in the exchangeable medium, the content receiver comprising: a license invalidating/validating unit that invalidates and validates a viewing license; an exchangeable medium reading/writing unit that writes out the content and the viewing license of the content to the exchangeable medium and that reads at least the viewing license written in the exchangeable medium; a viewing time limit setting unit that sets a viewing time limit; and a control unit, wherein when the control unit causes the exchangeable medium reading/writing unit to write out the content to the exchangeable medium before the content is reproduced, the control unit causes the exchangeable medium reading/writing unit to also write out the viewing license of the content to the exchangeable medium, and further causes the license invalidating/validating unit to invalidate a viewing license of related content belonging to a same predetermined content group as the content if the viewing time limit of the content is not determined, the content reproducer comprises: a viewing time limit determination unit that sets a current time to a start time to determine the viewing time limit of the content if the viewing time limit of the content is not determined when the content recorded in the exchangeable medium is reproduced; and a viewing license writing unit that records the viewing license of the content provided with the determined viewing time limit to the exchangeable medium, and when the exchangeable medium is installed on the content receiver after the reproduction of the content recorded in the exchangeable medium by the content reproducer, the control unit causes the viewing time limit setting unit to set a viewing time limit of the related content to the same time limit as the viewing time limit of the content and causes the license invalidating/validating unit to validate the viewing license of the related content.

The 7$^{th}$ aspect of the present invention is a viewing time limit determination method of content of a content utilization system, the content utilization system comprising: a content receiver that receives content, of which a viewing time limit is managed, from a content server and that writes out the content to an exchangeable medium; and a content reproducer that reproduces the content recorded in the exchangeable medium, the viewing time limit determination method comprising:

a content writing step, when the content receiver writes out the content to the exchangeable medium before the content is reproduced, of also writing out the viewing license of the content to the exchangeable medium, and invalidating a viewing license of related content belonging to a same predetermined content group as the content if the viewing time limit of the content is not determined;

a viewing time limit determination step, when the content reproducer reproduces the content recorded in the exchangeable medium, of determining the viewing time limit of the content by setting a current time to a start time if the viewing time limit of the content is not determined, and recording the viewing license of the content provided with the determined viewing time limit to the exchangeable medium; and a viewing time limit synchronization step, when the exchangeable medium is installed on the content receiver after the reproduction of the content by the content reproducer, of setting a viewing time limit of the related content to the same time limit as the viewing time limit of the content and validating the viewing license of the related content.

The 8$^{th}$ aspect of the present invention is a program embodied on a non-transitory computer-readable medium, the program causing a computer to execute the viewing time limit determination method according to the 7$^{th}$ aspect of the present invention.

The 9$^{th}$ aspect of the present invention is a content receiver that receives content, of which a viewing time limit is managed, from a content server, stores the content, and copies the content to an exchangeable medium, the content receiver comprising:

a license invalidating/validating unit that invalidates and validates a viewing license of the stored content; an exchangeable medium reading/writing unit that copies the stored content to the exchangeable medium, writes out a viewing license of the copied content on the exchangeable medium, to the exchangeable medium, and reads at least the viewing license written in the exchangeable medium; a viewing time limit setting unit that sets a viewing time limit; and a control unit, wherein when the control unit causes the exchangeable medium reading/writing unit to copy the stored content to the exchangeable medium before the stored content is reproduced, the control unit causes the exchangeable medium reading/writing unit to also write out the viewing license of the copied content to the exchangeable medium, and further causes the license invalidating/validating unit to invalidate a viewing license of the stored content if the viewing time limit of the copied content is not determined, and when the exchangeable medium recording the viewing license of the copied content, which is provided with the viewing time limit which is determined by a reproducer's reproducing of the copied content written out to the exchangeable medium, is installed, the control unit causes the viewing time limit setting unit to set a viewing time limit of the stored content to the same time limit as the viewing time limit of the copied content and causes the license invalidating/validating unit to validate the viewing license of the stored content.

The 10$^{th}$ aspect of the present invention is the content receiver according to the 9$^{th}$ aspect of the present invention, wherein when the stored content is reproduced while the exchangeable medium recording the viewing license of the copied content without a determined viewing time limit is installed, the control unit causes the license invalidating/validating unit to validate the viewing license of the stored content and causes the viewing time limit setting unit to determine the viewing time limit of the stored content and to set the viewing time limit of the copied content to the same time limit as the determined viewing time limit.

The 11$^{th}$ aspect of the present invention is the content receiver according to the 9$^{th}$ aspect of the present invention, wherein the invalidation of the viewing license of the stored content without a determined viewing time limit by the license invalidating/validating unit, denotes discard of the viewing license of the stored content, and the license invalidating/validating unit acquires the viewing license of the stored content again from the license server when the control unit validates the discarded viewing license of the stored content.

The 12$^{th}$ aspect of the present invention is a content utilization system comprising: a content receiver that receives content, of which a viewing time limit is managed, from a content server, stores the content, and copies the content to an exchangeable medium; and a content reproducer that reproduces the copied content recorded in the exchangeable medium, the content receiver comprising: a license invalidating/validating unit that invalidates and validates a viewing license of the stored content; an exchangeable medium reading/writing unit that copies the stored content to the exchangeable medium, writes out also a viewing license of the copied content on the exchangeable medium to the exchangeable medium, and reads at least the viewing license written in the exchangeable medium; a viewing time limit setting unit that sets a viewing time limit; and a control unit, wherein when the control unit causes the exchangeable medium reading/writing unit to copy the stored content to the exchangeable medium before the stored content is reproduced, the control unit causes the exchangeable medium reading/writing unit to also write out the viewing license of the copied content to the exchangeable medium, and further causes the license invalidating/validating unit to invalidate a viewing license of the stored content if the viewing time limit of the copied content is not determined, the content reproducer comprises: a viewing time limit determination unit that sets a current time to a start time to determine the viewing time limit of the copied content if the viewing time limit of the copied content is not determined when the copied content recorded in the exchangeable medium is reproduced; and a viewing license writing unit that records the viewing license of the copied content provided with the determined viewing time limit to the exchangeable medium, and when the exchangeable medium is installed on the content receiver after the reproduction of the copied content recorded in the exchangeable medium by the content reproducer, the control unit causes the viewing time limit setting unit to set a viewing time limit of the stored content to the same time limit as the viewing time limit of the copied content and causes the license invalidating/validating unit to validate the viewing license of the stored content.

The 13$^{th}$ aspect of the present invention is a viewing time limit determination method of content of a content utilization system, the content utilization system comprising: a content receiver that receives content, of which a viewing time limit is managed, from a content server, stores the content, and copies the content to an exchangeable medium; and a content reproducer that reproduces the copied content recorded in the exchangeable medium, the viewing time limit determination method comprising:

a content writing step, when the content receiver copying the stored content to the exchangeable medium before the stored content is reproduced, of also writing out the viewing license of the copied content to the exchangeable medium, and further invalidating a viewing license of the stored content if the viewing time limit of the copied content is not determined, a viewing time limit determination step, when the content reproducer reproduces the copied content recorded in the exchangeable medium, of determining the viewing time limit of the copied content by setting a current time to a start time if the viewing time limit of the copied content is not determined, and recording the viewing license of the copied content provided with the determined viewing time limit to the exchangeable medium, and a viewing time limit synchronization step, when the exchangeable medium is installed on the content receiver after the reproduction of the copied content by the content reproducer, of setting a viewing time limit of the stored content to the same time limit as the viewing time limit of the copied content and validating the viewing license of the stored content.

The 14$^{th}$ aspect of the present invention is a program embodied on a non-transitory computer-readable medium, the program causing a computer to execute the viewing time limit determination method according to the 13$^{th}$ aspect of the present invention.

ADVANTAGEOUS EFFECTS OF INVENTION

The present invention can provide a content receiver, a content utilization system, a viewing time limit determination method, and the like capable of synchronizing viewing time limits of a plurality of contents even if some of the plurality of contents that need to have the same viewing time limits are written out to an exchangeable medium before the viewing time limits are determined.

BRIEF DESCRIPTION OF DRAWINGS

FIG. 2(a) is a schematic diagram showing a viewing license with viewing time limit including information of a determined viewing time limit according to the embodiments of the present invention, FIG. 2(b) is a schematic diagram showing a viewing license with viewing term including information of a non-determined viewing time limit according to the embodiments of the present invention, FIG. 2(c) is a schematic diagram showing a writing license with viewing time limit including information of a determined viewing time limit according to the embodiments of the present invention, and FIG. 2(d) is a schematic diagram showing a writing license with viewing term including information of a non-determined viewing time limit according to the embodiments of the present invention.

FIG. 3 is a diagram showing a download content list on an HDD of a downloading terminal according to the embodiments of the present invention.

FIG. 4 is a diagram showing a download content list on an SD card according to the embodiments of the present invention.

FIG. 12 is a flow chart of a viewing time limit synchronization process in the downloading terminal when the SD card is inserted according to the second embodiment of the present invention.

FIG. 13 is a schematic diagram showing a format of a viewing time limit determination notification according to the second embodiment of the present invention.

FIG. 18 is a sequence diagram showing a divided view of pack content in a conventional content downloading system.

DESCRIPTION OF EMBODIMENTS

Hereinafter, embodiments of the present invention will be described with reference to the drawings.
(First Embodiment)

Figure 1:
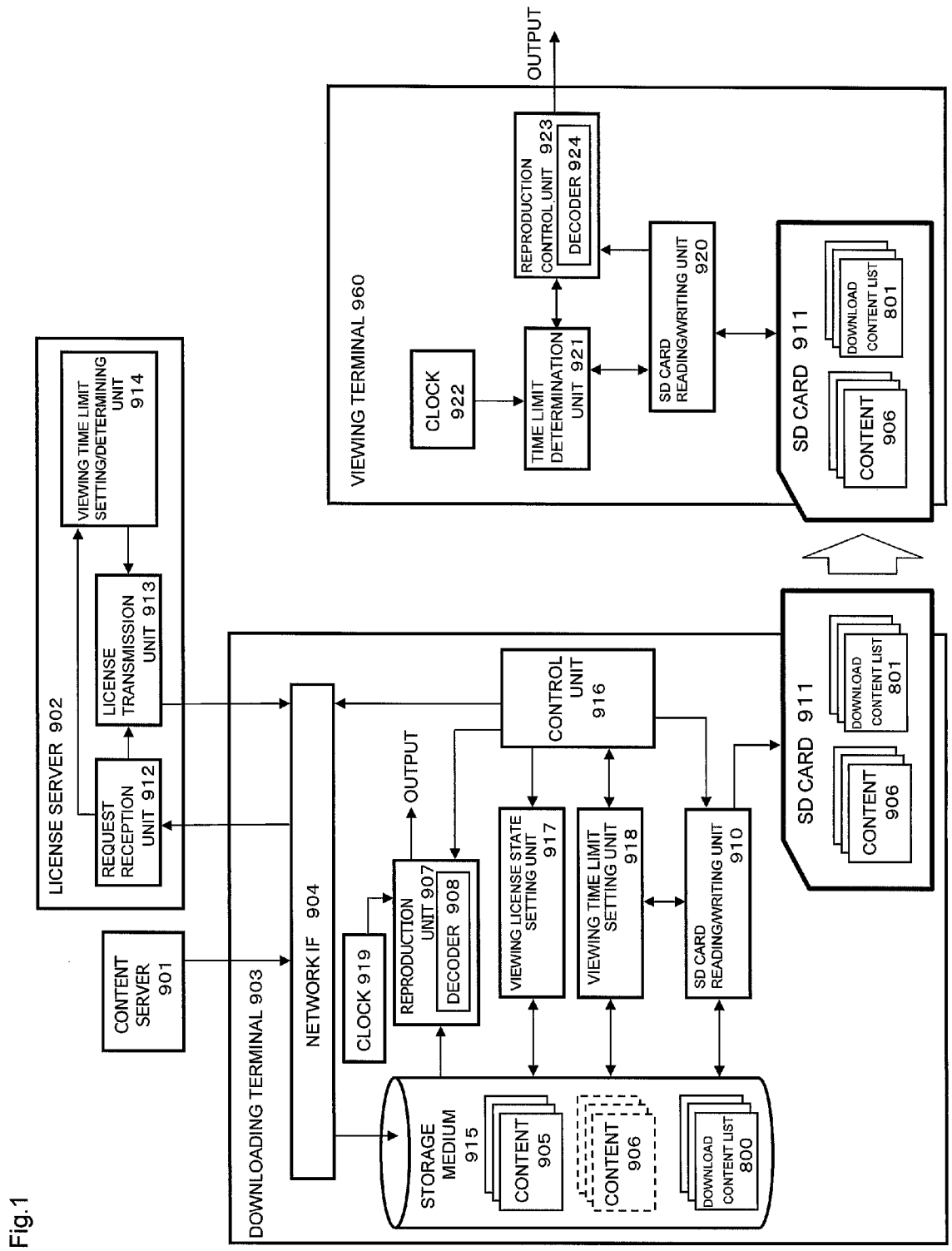
FIG. 1 is a block diagram of a content utilization system according to embodiments of the present invention.

FIG. 1 is a block diagram of a content utilization system according to a first embodiment of the present invention.

A downloading terminal 903 is connected to a content server 901 and a license server 902 through the Internet (not shown).

A network IF 904 of the downloading terminal 903 downloads encoded contents from the content server 901 connected through the Internet to store the encoded contents as contents 905 and 906 in a storage medium 915, such as an HDD, and acquires viewing licenses of the downloaded contents 905 and 906 from the license server 902 to store the viewing licenses as a download content list 800.

When reproduction of one of the contents stored in a storage medium 915 is instructed by an instruction from the user (not shown), a control unit 916 controls a reproduction unit 907 to read out a license of the target content from the download content list 800, to check viewing conditions, to set a content decryption key to a decoder 908, and to read out the encoded contents 905 and 906 to start decoding and reproduction.

In the checking of the viewing conditions, the reproduction unit 907 acquires a viewing time limit of the target content from the download content list 800 and compares the viewing time limit with the current time acquired from a clock 919 to judge whether the viewing time limit is over. If the viewing time limit is not over, the reproduction unit 907 determines that the content can be reproduced and decodes and reproduces the content.

The control unit 916 also controls an SD card reading/writing unit 910 based on an instruction from the user (not shown) to record some or all of the stored contents 905 and 906 in an SD card 911, to record a download content list 801 related to the contents in the SD card 911, or to read data from the SD card 911.

The downloading terminal 903 is an example of a content receiver of the present invention, and the SD card 911 is an example of an exchangeable medium of the present invention. The network IF 904 is an example of a transmission/reception unit of the present invention, and the SD card reading/writing unit 910 is an example of an exchangeable medium reading/writing unit of the present invention.

The SD card 911 including the content 906 written out by the downloading terminal 903 is inserted to a viewing terminal 960. When reproduction of one of the contents 906 on the SD card 911 is instructed by an instruction from the user (not shown), a reproduction control unit 923 causes a time limit determination unit 921 to read the download content list 801 from the SD card 911. The reproduction control unit 923 acquires a content decryption key from the download content list 801 in accordance with the judgment result acquired from the time limit determination unit 921 to set the content decryption key to a decoder 924 and reads the encoded content 906 by an SD card reading/writing unit 920 to start decoding and reproduction.

The time limit determination unit 921 acquires viewing time limit information of the target content from the download content list 801 and compares the viewing time limit information with the current time acquired from the clock 922 to judge whether the viewing time limit is not over. The time limit determination unit 921 judges that the content can be reproduced if the viewing time limit is not over, judges that the content cannot be reproduced if the viewing time limit is over, and notifies the reproduction control unit 923 of the judgment result.

The viewing terminal 960 is an example of a content reproducer of the present invention. The time limit determination unit 921 is an example of a viewing time limit determination unit of the present invention. The SD card reading/writing unit 920 is an example of a viewing license writing unit of the present invention.

In the license server 902, a license transmission unit 913 returns a license corresponding to the designated content to the downloading terminal 903 when a request reception unit 912 receives a license request from the downloading terminal 903. In that case, if the request reception unit 912 receives a license request including a determination request of the viewing time limit (request of license with viewing time limit), a viewing time limit setting/determining unit 914 determines the viewing time limit of the designated content, and the license transmission unit 913 returns the license with the determined viewing time limit to the downloading terminal 903.

FIG. 2 is a diagram showing viewing licenses and writing licenses supplied by the license server 902 to the downloading terminal 903 in the present first embodiment.

FIG. 2(a) shows a viewing license 700 with viewing time limit which includes information of a determined viewing time limit. FIG. 2(b) shows a viewing license 701 with viewing term which includes information of a non-determined viewing time limit. FIG. 2(c) shows a writing license 710 with viewing time limit which includes information of a determined viewing time limit. FIG. 2(d) shows a writing license 712 with viewing term which includes information of a non-determined viewing time limit.

The viewing license 700 with viewing time limit includes a license type 713 indicative of a license with a viewing time limit, a content ID 705 as an identifier of target content, a pack ID 714 as a group identifier of pack content, a decryption key 702 for decoding encoded content, a viewing term 703 indicating a period that the target content can be viewed, and a viewing time limit 704 indicating a determined period allowing to view the target content by viewing time limit start date/time and viewing time limit end date/time indicated by absolute date/time.

Although the configuration of the viewing license 701 with viewing term is similar, the differences are whether the viewing term 703, the viewing time limit start, and the viewing time limit end include significant values.

A media type 711 indicating a medium to which content can be written out by the license is added to the writing license 710 with viewing time limit and to the writing license 712 with viewing term.

The same pack ID 714 is provided to each of the pack contents belonging to the same content group. As described, since the same viewing time limit needs to be set to the pack contents belonging to the same content group, the same viewing time limit needs to be set to the contents provided with the same pack ID 714.

In FIG. 1, the content 905 and the content 906 are contents with the same pack ID 714. In the description of the present first embodiment, the content 906 among the contents with the same pack ID is written out to the SD card 911, and the content 905 is left in the downloading terminal 903.

The content 906 in the present first embodiment is an example of content written out to an exchangeable medium of the present invention. The content 905 is an example of related content of the present invention. The contents 905 and 906 with the same pack ID are an example of content belonging to a same predetermined content group of the present invention.

FIG. 3 is the download content list 800 as a specific form of the viewing licenses stored in the downloading terminal 903 according to the present first embodiment.

Information included in the viewing license acquired to download the content from the content server 901 is written in the download content list 800 content by content.

A valid/invalid flag 808 of the download content list 800 is a flag indicating whether the viewing license is in an available state. A viewing license state setting unit 917 sets validity and invalidity of the valid/invalid flag 808 in accordance with an instruction from the control unit 916. The viewing license state setting unit 917 is an example of a viewing license invalidating/validating unit of the present invention.

Significant values are described in the viewing time limit start and the viewing time limit end indicating the viewing time limit 704 in the contents shown by entry numbers 1 and 3 of FIG. 3, and the description indicates that the viewing time limits of the contents are determined. On the other hand, significant values are not written in the viewing time limit start and the viewing time limit end in the contents shown by entry numbers 2 and 4, and significant values are written only in the viewing term 703. The contents indicate that although the viewing time limits are managed for the contents, the viewing time limits are not determined because the contents have never been reproduced by the downloading terminal 903 after the download from the content server 901.

FIG. 4 is the download content list 801 as a specific form of the viewing licenses written in the SD card 911 according to the present first embodiment. The download content list 801 is the same as the download content list 800, except for the presence of a valid/invalid flag 808.

The download content list 801 is an example of viewing licenses written out to an exchangeable medium of the present invention.

Figure 5:
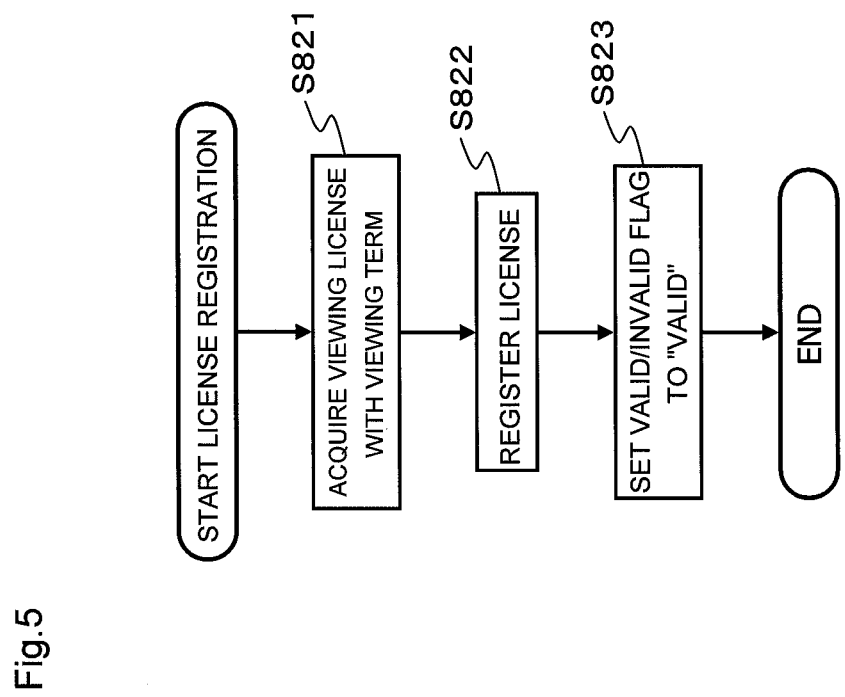
FIG. 5 is a flow chart of a viewing license registration process in the downloading terminal for acquiring a viewing license of content stored in the downloading terminal according to the embodiments of the present invention.

FIG. 5 is a flow chart of a viewing license registration process when the downloading terminal 903 of the present first embodiment acquires the viewing licenses of the contents 905 and 906 stored in the storage medium 915.

Figure 6:
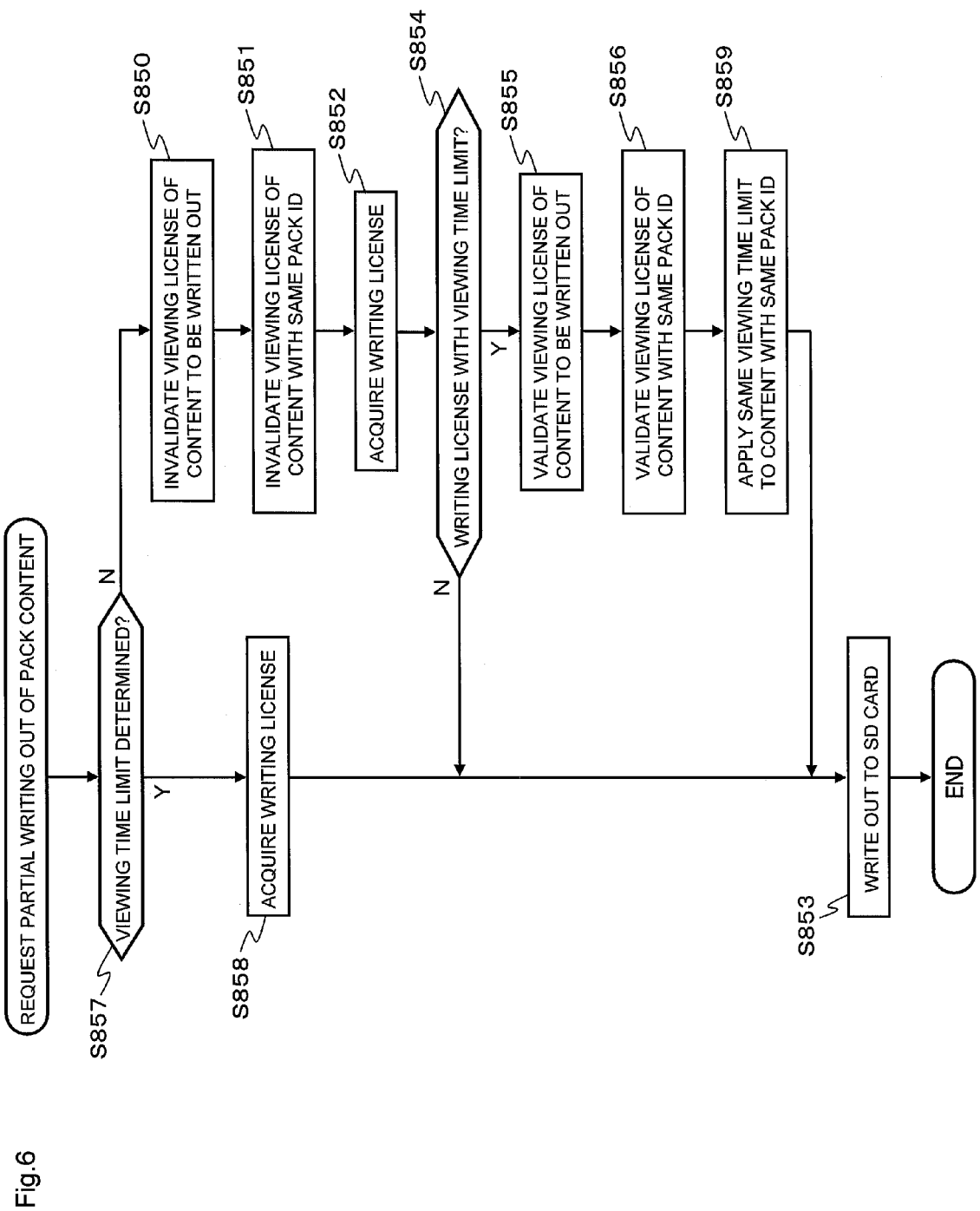
FIG. 6 is a flow chart of a process in the downloading terminal for writing out pack content to the SD card according to first and second embodiments of the present invention.

FIG. 6 is a flow chart of a writing process when the downloading terminal 903 of the present first embodiment writes out the pack content 906 stored in the storage medium 915 to the SD card 911.

Figure 7:
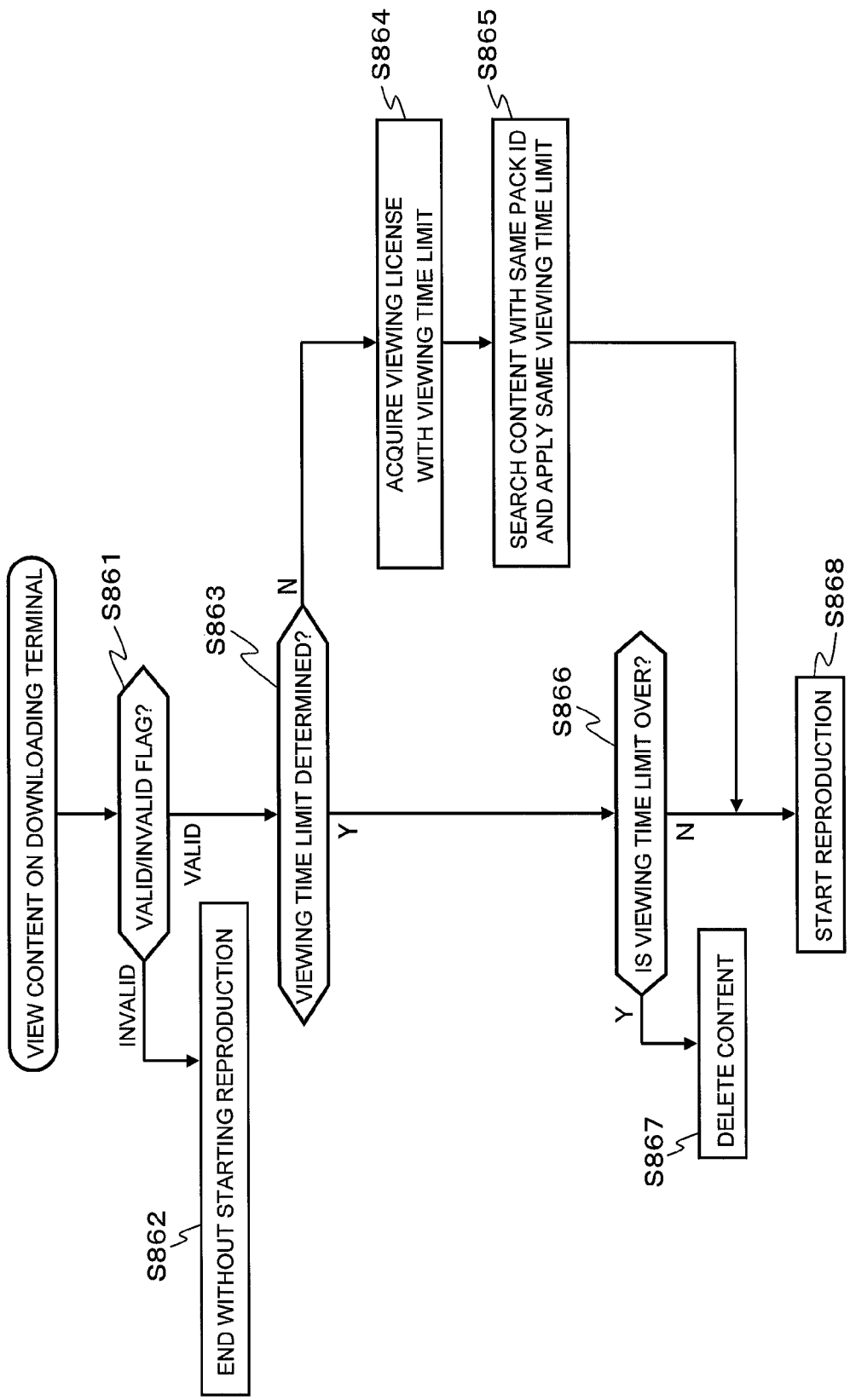
FIG. 7 is a flow chart showing a process at the start of viewing in the downloading terminal for reproducing the content stored in the downloading terminal according to the embodiments of the present invention.

FIG. 7 is a flow chart of a viewing start process when the downloading terminal 903 reproduces the pack content 905 stored in the storage medium 915 according to the present first embodiment.

Figure 8:
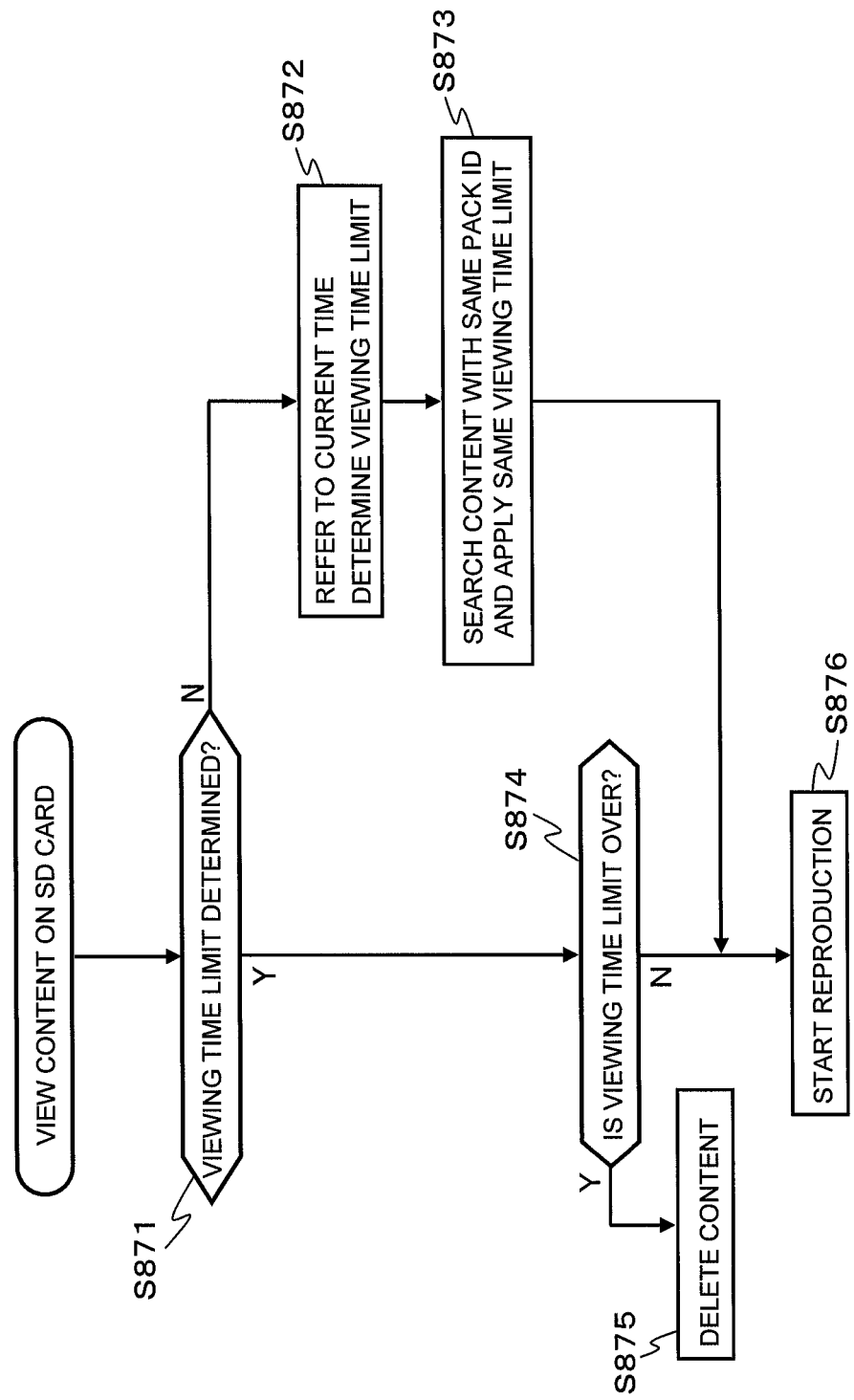
FIG. 8 is a flow chart showing a process at the start of reproduction of the content on the SD card in the viewing terminal according to the embodiments of the present invention.

FIG. 8 is a flow chart of a viewing start process when the viewing terminal 960 views the pack content 906 recorded in the SD card 911 according to the present first embodiment.

Figure 9:
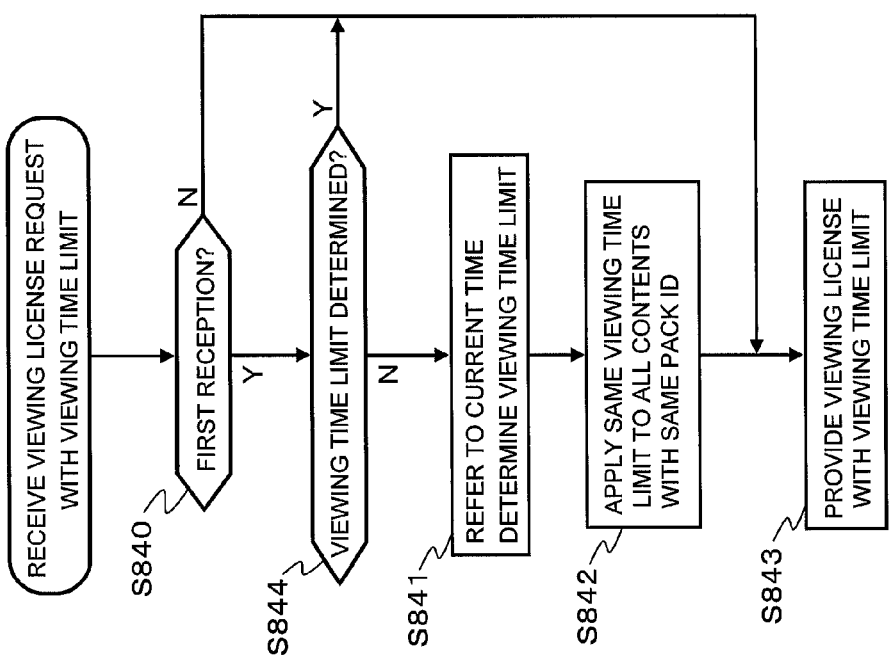
FIG. 9 is a flow chart showing a process at the reception of a viewing license request with viewing time limit in a license server according to the embodiments of the present invention.

FIG. 9 is a flow chart of a viewing license providing process in the license server 902 of the present first embodiment.

Figure 10:
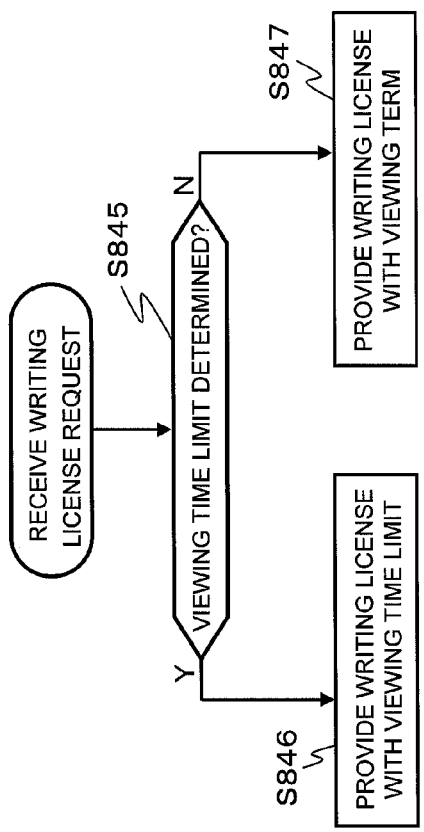
FIG. 10 is a flow chart showing a process at the reception of a writing license request in the license server according to the embodiments of the present invention.

FIG. 10 is a flow chart of a writing license providing process in the license server 902 of the present first embodiment.

Figure 11:
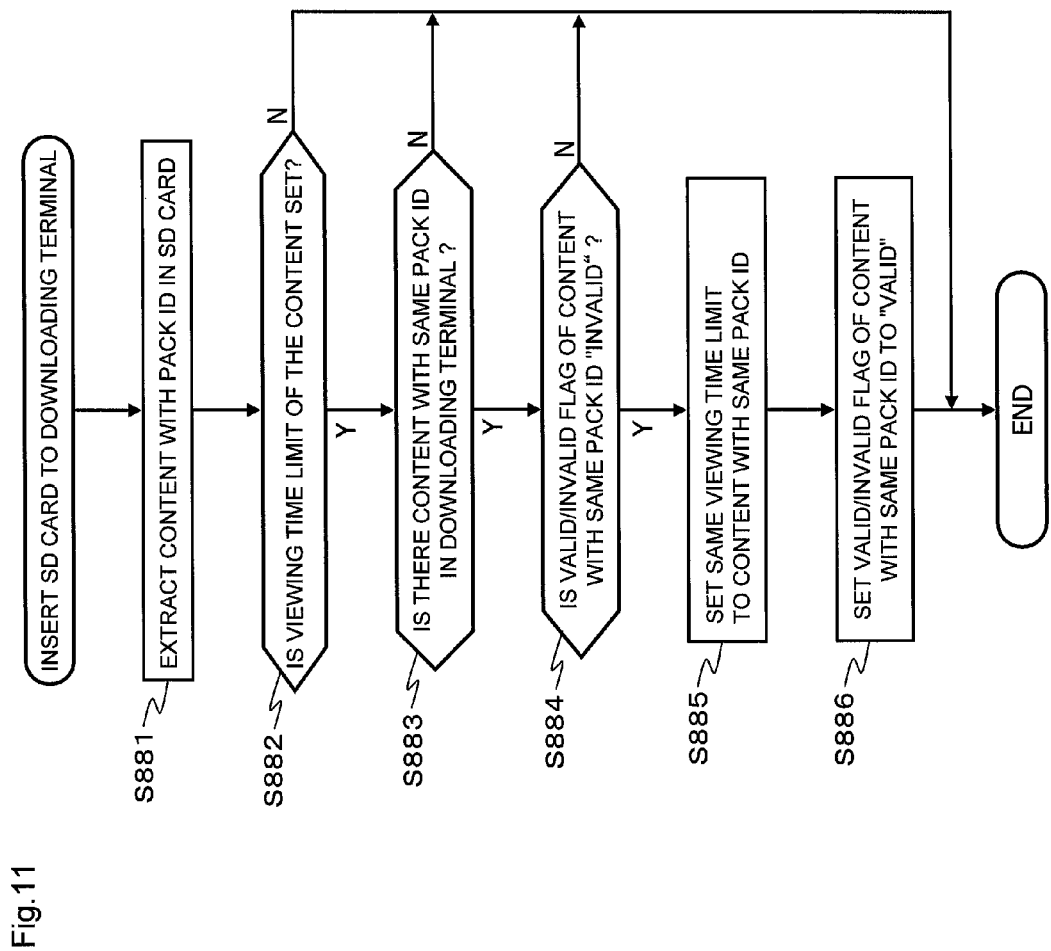
FIG. 11 is a flow chart of a viewing time limit synchronization process in the downloading terminal when the SD card is inserted according to the first embodiment of the present invention.

FIG. 11 is a flow chart of a viewing time limit synchronization process when the SD card 911 is inserted to the downloading terminal 903 according to the present first embodiment.

Operations of the content utilization system of the present first embodiment for handling download contents, in which the viewing time limit is not determined at first but is determined by the start of first viewing, will be described.

Hereinafter, an operation when contents with the same pack ID are written out to the SD card 911 after reproduction by the downloading terminal 903 and an operation when some of the contents with the pack ID are written out to the SD card 911 without reproduction of any contents with the same pack ID by the downloading terminal 903 will be sequentially described using FIGS. 1 to 11.

First, an operation when the contents with the same pack ID are written out to the SD card 911 after reproduction by the downloading terminal 903 will be described.

In the downloading terminal 903, a registration process of the viewing licenses of the contents 905 and 906 is executed in accordance with the flow of FIG. 5 after completion of the download of the encoded contents 905 and 906 or in other cases.

The control unit 916 uses the network IF 904 to acquire the viewing license 701 with viewing term from the license server 902 (step S821), adds the pack ID 714, the viewing term 703, and the decryption key 702 described in the acquired viewing license 701 with viewing term as entries of the download content list 800 along with the content ID 705 (step S822), and sets the valid/invalid flag 808 of the entries to "valid" (step S823).

The control unit 916 of the downloading terminal 903 controls reproduction of the content in accordance with the flow shown in FIG. 7 to reproduce the content 905 downloaded from the content server 901 and stored in the storage medium 915 by the downloading terminal 903 before the content 905 is written out to the SD card 911.

In the description here, it is assumed that none of the pack contents with the same pack ID has been reproduced after the download of the pack contents to the downloading terminal 903 and that the content 905 with the pack ID is reproduced for the first time.

When a reproduction instruction for the content 905 downloaded and stored in the storage medium 915 is received from the user (not shown), the control unit 916 first causes the viewing license state setting unit 917 to search the download content list 800 to check the setting of the valid/invalid flag 808 (step S861). In this case, since the contents with the same pack ID are not written out to the SD card 911, the valid/invalid flag 808 set "valid" in step S823 of FIG. 5 is not changed, and the following process of step S863 is executed.

The control unit 916 causes a viewing time limit setting unit 918 to search the download content list 800 to check whether the viewing time limit of the content is determined (step S863). The viewing time limit is not determined because this is the first viewing of the content, and the following process of step S864 is executed.

The control unit 916 uses the network IF 904 to acquire the viewing license 700 with viewing time limit of the content from the license server 902 (step S864) and causes the viewing time limit setting unit 918 to write, in the area of the download content list 800, values of the viewing time limit start and the viewing time limit end set as the viewing time limit 704 described in the acquired viewing license 700 with viewing time limit.

The viewing time limit setting unit 918 searches contents with the same pack ID as that of the content on the download content list 800 and applies the same process to all the contents. More specifically, the same value of the viewing time limit 704 is set to all contents with the same pack ID as that of the content (step S865). In this case, the viewing license 700 with viewing time limit of the content 905 is acquired, and the viewing time limit of the content 905 is determined. Therefore, the same viewing time limit as the determined viewing time limit of the content 905 is set to the viewing time limit of the content 906 with the same pack ID as that of the content 905.

A valid value, in which the current time is set to the start of the viewing time limit by the license server 902, is set to the viewing time limit 704 of the viewing license 700 with viewing time limit acquired in step S864. Therefore, the control unit 916 causes the reproduction unit 907 to use the viewing license to decode and reproduce the content 905 (step S868).

A determination operation of the viewing time limit in the license server 902 that has received the request of the viewing license with viewing time limit transmitted by the downloading terminal 903 in step S864 will be described.

The license server 902 that has received the request of the viewing license with viewing time limit checks and determines the viewing time limit of the requested content in accordance with the flow shown in FIG. 9 and returns the viewing license 700 with viewing time limit including the determined viewing time limit information (the viewing time limit 704) to the downloading terminal 903.

When the request reception unit 912 receives the viewing license request with viewing time limit from the downloading terminal 903, the viewing time limit setting/determining unit 914 checks whether the viewing license request including the determination request of the viewing time limit for the content designated by the viewing license request with viewing time limit is received for the first time from history information (not shown) of the license server based on the content ID (step S840).

In this case, the target content 905 has not yet been reproduced by the downloading terminal 903. Therefore, the reception of the viewing license request with viewing time limit is the first reception of the license request including the determination request of the viewing time limit, and it is judged in step S840 that the reception is the first reception. Whether the viewing time limit of the target content is already determined is then searched from the history information (not shown) of the license server (step S844).

Even if the first viewing license request with viewing time limit for the target content is received, the viewing time limit of the target content is determined at that point when the viewing license request with viewing time limit of the content with the same pack ID as the target content is received before (step S842). Therefore, the viewing time limit of the target content may be already determined.

If it is judged in step S844 that the viewing time limit of the target content 905 is not determined, the viewing time limit setting/determining unit 914 sets the current time to the viewing time start time and adds the viewing term to the viewing time limit start time to calculate the viewing time limit end time to determine the viewing time limit of the content (step S841). At this point, the same viewing time limits are similarly determined for all contents with the same pack ID as that of the content (step S842).

The license transmission unit 913 then returns the viewing license 700 with viewing time limit including the determined viewing time limit 704 to the downloading terminal 903 (step S843).

If the viewing time limit of the target content is already determined in step S844, the viewing license 700 with viewing time limit including the determined viewing time limit 704 is returned to the downloading terminal 903 (step S843).

To write out the content 906 with the same pack ID as that of the content 905 to the SD card 911 after the reproduction by the downloading terminal 903, the control unit 916 of the downloading terminal 903 controls writing out by the SD card reading/writing unit 910 in accordance with the flow shown in FIG. 6.

The control unit 916 first judges whether the viewing time limit of the target content to be written out is determined (step S857). The control unit 916 causes the viewing time limit setting unit 918 to judge whether the viewing time limit is determined based on the information of the viewing term 703 and the viewing time limit 704 of the download content list 800. In this case, since the downloading terminal 903 has reproduced the content 905 with the same pack ID as the target content 906 to be written out, the viewing time limit of the target content 906 to be written out in step S865 of FIG. 7 is determined. The control unit 916 uses the network IF 904 to acquire the writing license from the license server 902 (step S858).

The control unit 916 then causes the SD card reading/writing unit 910 to use the writing license to execute a writing process to the SD card 911 (step S853). In this case, the values of the download content list 800 are copied to the areas of the download content list 801 to be written out to the SD card 911.

The content 906 written out to the SD card 911 by the downloading terminal 903 is viewed on the viewing terminal 960.

The viewing terminal 960 controls the reproduction of the content 906 on the SD card 911 in accordance with the flow shown in FIG. 8.

When reproduction of the content 906 recorded in the SD card 911 is instructed by an instruction from the user (not shown), the reproduction control unit 923 causes the time limit determination unit 921 to judge whether the viewing time limit of the target content is determined (step S871). In the time limit determination unit 921, the SD card reading/writing unit 920 reads the download content list 801 recorded in the SD card 911 and judges whether the viewing time limit is determined based on the information of the viewing term 703 and the viewing time limit 704 of the target content.

In this case, as the downloading terminal 903 has reproduced the content 905 with the same pack ID, the viewing time limit of the target content 906 is determined (step S865). Therefore, the time limit determination unit 921 judges whether the viewing time limit is not over (step S874). The time limit determination unit 921 compares the determined viewing time limit 704 of the target content acquired from the download content list 801 with the current time acquired from the clock 922 to judge whether the viewing time limit is already over and notifies the reproduction control unit 923 of the judgment result. If it is judged that the viewing time limit is already over, the reproduction control unit 923 deletes the content 906 (step S875). If the viewing time limit is not over, the reproduction control unit 923 starts decoding and reproducing the content 906 (step S876).

In this way, if the content 906 with the same pack ID is written out to the SD card 911 after the reproduction of the content 905 by the downloading terminal 903, the same viewing time limit as the reproduced content 905 is set as the viewing time limit of the content 906 with the same pack ID upon the reproduction by the downloading terminal 903 (step S865). Therefore, the viewing time limit of the content 906 written out to the SD card 911 later can be synchronized.

An operation when the contents 905 and 906 with the same pack ID are not reproduced by the downloading terminal 903, and some of the contents 906 with the same pack ID are written out to the SD card 911 will be described.

A registration process of the viewing licenses of the contents 905 and 906 executed after the completion of the download or the like is the same as the process described using the flow of FIG. 5, and the description will not be repeated.

The control unit 916 of the downloading terminal 903 controls writing out in accordance with the flow shown in FIG. 6 to write out some of the contents 906 with the same pack ID to the SD card 911 when the contents 905 and 906 with the same pack ID have never been reproduced by the downloading terminal 903 after download from the content server 901 and storage in the storage medium 915.

When a writing request instruction of pack content is received from the user (not shown), the control unit 916 first judges whether the viewing time limit of the target content 906 to be written out is determined (step S857). In this case, since the contents 905 and 906 with the same pack ID as the target content 906 to be written out have never been reproduced by the downloading terminal 903, the viewing time limit of the content 906 is not determined, and the following process of step S850 is executed.

The control unit 916 causes the viewing license state setting unit 917 to set the valid/invalid flag 808 of the target content 906 to be written out to "invalid" in the download content list 800 (step S850) and to set the valid/invalid flag 808 of the content 905 with the same pack ID as the target content 906 to be written out among the contents not to be written out to "invalid" (step S851).

The control unit 916 then transmits the writing license request of the target content 906 to be written out to the license server 902 to acquire the writing license from the license server 902 (step S852) and uses the writing license to control writing out to the SD card 911.

If the writing license acquired in step S852 is the writing license 712 with viewing term (step S854), the control unit 916 controls the SD card reading/writing unit 910 to write out the target content to the SD card 911 without changing the download content list 800 (step S853).

If the writing license acquired in step S852 is the writing license 710 with viewing time limit (step S854), the determined viewing time limit 704 is set. Therefore, the control unit 916 causes the viewing license state setting unit 917 to change the valid/invalid flag 808 of the target content 906 to be written out to "valid" in the download content list 800 (step S855) and to change the valid/invalid flag 808 of the content 905 with the same pack ID 714 as that of the target content 906 to be written out to "valid" (step S856). The control unit 916 also causes the viewing time limit setting unit 918 to set the same viewing time limit as the determined viewing time limit 704 set to the writing license 710 with viewing time limit to the viewing time limit 704 of all contents 905 with the same pack ID 714 as that of the target content 906 to be written out (step S859).

An operation of the license server 902 when the downloading terminal 903 requests the license server 902 for the writing license in steps S852 and S853 of FIG. 6 will be described here.

When the request of the writing license is received from the downloading terminal 903, the license server 902 executes a providing process of the writing license in accordance with the flow of FIG. 10.

When the request reception unit 912 receives the request of the writing license from the downloading terminal 903, the viewing time limit setting/determining unit 914 searches whether the viewing time limit of the content is already determined based on the history information (not shown) of the license server (step S845).

If the viewing time limit of the content is already determined, the license transmission unit 913 returns the writing license 710 with viewing time limit including the determined viewing time limit to the downloading terminal 903 (step S846). If the viewing time limit is not determined, the license transmission unit 913 returns the writing license 712 with viewing term without a determined viewing time limit to the downloading terminal 903 (step S847).

In the following description, it is assumed that the writing license acquired in step S852 is the writing license 712 with viewing term. In other words, it is assumed that the viewing time limit of the content 906 written out to the SD card 911 is not determined.

The control unit 916 first checks the setting of the valid/invalid flag 808 of the reproduction target content 905 in accordance with the flow of FIG. 7 to reproduce the content 905 stored in the storage medium 915 with the same pack ID by the downloading terminal 903 after some of the pack contents 906 are written out to the SD card 911 (step S861).

Since the valid/invalid flag 808 of the reproduction target content 905 is set to "invalid" in step S851 and is not changed, the control unit 916 ends the process without permitting the reproduction of the reproduction target content 905 (step S862).

The content 906 written out to the SD card 911 by the downloading terminal 903 is viewed on the viewing terminal 960.

The viewing terminal 960 controls the reproduction of the content 906 on the SD card 911 in accordance with the flow shown in FIG. 8.

When the reproduction of the content 906 recorded in the SD card 911 is instructed by an instruction from the user (not shown), the reproduction control unit 923 first causes the time limit determination unit 921 to refer to the field of the content of the download content list 801 to judge whether the viewing time limit of the content 906 is determined (step S871).

In this case, since the target content 906 is written out to the SD card 911 while the viewing time limit is not determined, it is judged in step S871 that the viewing time limit is not determined.

Since the viewing time limit of the content 906 is not determined, the time limit determination unit 921 acquires the current time from the clock 922 to set the current time to the viewing time limit start time, adds the viewing term 703 to the viewing time limit start time to calculate the viewing time limit end time to determine the viewing time limit 704, writes the values in the download content list 801 (step S872), searches the contents with the same pack ID 714 as that of the content 906 on the download content list 801, and applies the same process to all the contents (step S873).

The reproduction control unit 923 uses the decryption key 702 described in the download content list 801 to start decoding and reproducing the content 906 (step S876).

An operation of the downloading terminal 903 when the SD card 911 is inserted to the downloading terminal 903 after the reproduction of the content 906 written out to the SD card 911 by the viewing terminal 960 will be described.

When the SD card 911 is inserted, the downloading terminal 903 executes a viewing time limit synchronization process in accordance with the flow shown in FIG. 11.

When the insertion of the SD card 911 is notified from the SD card reading/writing unit 910, the control unit 916 causes the viewing time limit setting unit 918 to refer to the download content list 801 on the SD card 911 to extract content (hereinafter, referred to as "content CA") including the pack ID 714 (step S881). In this case, the content 906 is extracted as the content CA.

If the viewing time limit 704 is set to the content CA (step S882), the viewing time limit setting unit 918 refers to the download content list 800 to check the presence of content (referred to as "content CB") with the same pack ID 714 (step S883). In this case, the content 905 is extracted as the content CB.

If there is the content CB, the control unit 916 causes the viewing license state setting unit 917 to check the state of the valid/invalid flag 808 of the content CB (step S884).

If the valid/invalid flag 808 of the content CB is "invalid", the control unit 916 causes the viewing time limit setting unit 918 to set the viewing time limit set to the content CA to the viewing time limit of the content CB (to write the viewing time limit in the download content list 800) (step S885). The control unit 916 causes the viewing license state setting unit 917 to change the valid/invalid flag 808 of the content CB to "valid" (step S886).

In this way, to write out some of the contents 906 with the pack ID to the SD card 911 without the reproduction of any of the contents 905 and 906 with the same ID by the downloading terminal 903, the reproduction of the content 905 with the same pack ID as the content 906 brought out by the SD card 911 is prohibited in the downloading terminal 903 if the SD card 911 is not installed, and the same viewing time limit as the content 906 on the SD card 911 is set when the SD card 911 is installed to permit the reproduction. Therefore, the viewing time limits of the contents 905 and 906 with the same pack ID on the downloading terminal 903 and on the SD card 911 can be synchronized.

The case in which the valid/invalid flag 808 is "invalid" and the case in which the viewing time limit is not determined in the reproduction of the content 905 stored in the storage medium 915 in the flow of FIG. 7 have been described. However, if the viewing time limit is determined in step S863, the process after step S866 is executed. Since the viewing time limit is set at the initial reproduction in step S864, it is judged in 5863 that the viewing time limit is determined in, for example, the second and following reproductions of the same content.

In that case, the reproduction unit 907 compares the viewing time limit 704 of the download content list 800 with the current time acquired from the clock 919 in step S866 and deletes the content if the viewing time limit is over (step S867). If the viewing time limit is not over, the reproduction unit 907 starts decoding and reproducing the content (step S868).

As described, when pack content without a determined viewing time limit is written out to the SD card, the content in the downloading terminal with the same pack ID as the content is set to a viewing disabled state. The viewing time limit is set to the content with the same pack ID as that of the content with a determined viewing time limit when the SD card is inserted to the downloading terminal, and the viewing disabled state is canceled. In this way, the viewing time limit based on the time of the first view of one of the pack contents is set for the pack contents separated and saved on the downloading terminal and the SD card. Therefore, the time limit synchronization of the pack contents can be secured.

Although the SD card reading/writing unit 910 records the license (download content list 801) related to the content 906 in the SD card 911 in the description of the present first embodiment, the SD card reading/writing unit 910 may convert and write out the content in a parameter format of another copyright protection system instead of recording the license. The content can be flexibly utilized by writing out the content by a copyright protection system that facilitates the process by the viewing terminal 960, such as a system with few processing loads of CPU, less used memory, and high reproduction compatibility.

In the present first embodiment, the viewing licenses and the writing licenses shown in FIG. 2 are just examples, and the licenses do not prescribe the notations and configurations of content of the licenses.

Although the viewing license registration process is executed after the completion of the download of the content in the description of the present first embodiment, it is obvious that the same effect can be obtained by acquiring and registering the viewing license 701 with viewing term before the download or during the download of the content.

Although the viewing license registration process is executed after the completion of the download of the content in the description of the present first embodiment, it is obvious that the effect of realization of viewing while downloading can be obtained by acquiring the viewing license 700 with viewing time limit when viewing of the content is started during the download of the content.

Although the entries including the pack ID 714 and the decryption key 702 described in the viewing license 701 with viewing term are registered in the download content list 800 in the viewing license registration process in the description of the present first embodiment, the entries may not be registered if a valid pack ID or decryption key is not described in the viewing license 701 with viewing term (such as when the field value is empty).

Although the valid/invalid flags 808 of the target content 906 written out first and of the content 905 with the same pack ID as that of the target content 906 to be written out are set to "invalid" if the viewing time limit is not determined in step S857 of FIG. 6 upon writing out to the SD card 911 in the description of the present first embodiment (steps S850 and S851), it is obvious that the same effect can be obtained without temporarily changing the valid/invalid flag 808 to "invalid" for the content written out using the writing license 710 with viewing time limit.

Although the process ends without starting the reproduction if the valid/invalid flag 808 is "invalid" in the flow shown in FIG. 7 upon viewing of the content on the downloading terminal 903 (step S862) in the description of the present first embodiment, it is obvious that the same effect can be obtained by prohibiting to view or select content, in which the valid/invalid flag 808 is invalid, when the user selects viewable content.

Although the process ends without the start of the reproduction if the valid/invalid flag 808 is "invalid" in the flow shown in FIG. 7 (step S862) in the description of the present first embodiment, if the SD card 911 is inserted and all contents that include the same pack ID as that of the content about to be reproduced and that include the pack ID written out by the downloading terminal 903 are included in the SD card 911, the valid/invalid flag 808 of the content about to be reproduced may be changed to "valid" to reproduce the content even if the viewing time limits of the contents with the pack ID on the SD card 911 are not determined.

More specifically, when an attempt is made to reproduce the content 905 in the storage medium 915 after the content 906 without a determined viewing time limit is written out to the SD card 911 in the configuration of the present first embodiment, the valid/invalid flag 808 of the content 905 is set to "invalid". However, if the SD card 911 including the written out content 906 is inserted to the downloading terminal 903, the valid/invalid flag 808 of the content 905 may be changed to "valid" to advance the process to step S863 of FIG. 7 even if the content 906 is not reproduced and the viewing time limit is not determined.

In this case, although the viewing time limit of the content 906 is still not determined, the contents with the same pack ID as the content 905 are not reproduced yet, and the viewing time limits are not different between the same pack contents. Therefore, the content 905 may be able to be reproduced. The viewing time limits of the pack contents are determined by the start of the reproduction of the content 905, and the same date and time are set to the viewing time limits of the pack contents. Therefore, the viewing time limits of the pack contents are synchronized.

In the present first embodiment, when the downloading terminal 903 reproduces the content 905 in which the available state of the viewing license is "valid" and the viewing time limit is not determined, the viewing license 700 with viewing time limit is acquired as shown in the flow of FIG. 7 to determine the viewing time limit (step S864). However, instead of requesting the viewing license 700 with viewing time limit, the downloading terminal 903 may refer to the current time to determine the viewing time limit of the content 905.

In the present first embodiment, the available state of the license is set and checked by the valid/invalid flag 808. However, instead of using the valid/invalid flag 808, the viewing license may be temporarily deleted to disable the use of the license. In this case, the viewing license is acquired again from the license server 902 to validate the temporarily discarded viewing license. The decryption key 702 included in the viewing license 700 with viewing time limit acquired again is used to decode and reproduce the content.

In the description of the present first embodiment, the field of the content of the download content list 801 is referred upon viewing of the content on the SD card 911, and the viewing time limit 704 is calculated from the current time and the viewing term 703 if the viewing time limit 704 is not set. However, the contents with the same pack ID 714 as that of the content may be searched on the download content list 801, and the value may be set as the viewing time limit of the content if the viewing time limit 704 is set to one of the contents.

In the description of the present first embodiment, if the viewing time limit 704 of the content is set upon viewing of the content on the downloading terminal 903 or the viewing terminal 960, the reproduction is started after the check for the excess of the viewing time limit. However, the contents with the same pack ID may be searched before the start of the reproduction, and the same values of the viewing time limit start and the viewing time limit end may be written in the viewing time limits 704 of all contents if the contents exist.

The process allows obtaining an effect of setting unified viewing time limits to pack contents additionally stored in the downloading terminal 903 or written out to the SD card 911.

The reproduction of the content may not be started if the viewing time limits of the contents with the same pack ID do not match in the downloading terminal 903 and the viewing terminal 960. The process allows obtaining another effect of preventing viewing of the contents sold in pack when the viewing time limit is not proper.

If the viewing time limits of the contents with the same pack ID do not match in the downloading terminal 903 and the viewing terminal 960, the viewing time limits may be compared to assume the oldest viewing time limit as the viewing time limit of the pack. The process also allows obtaining an effect of unifying the viewing time limits of contents sold in pack.

It is obvious that the time limit synchronization of the pack contents can be secured by setting the contents on the SD card 911 to the viewing disabled state upon writing out and by updating the viewing time limits of the contents on the SD card 911 to cancel the viewing disable state if the viewing time limits of the contents on the downloading terminal 903 with the same pack ID as the contents set to the viewing disabled state on the SD card 911 are determined when the SD card 911 is inserted to the downloading terminal 903.

In the deletion of the content 906 on the SD card 911 due to a reason, such as an excess of viewing time limit in the viewing terminal 960, only the entity of the content 906 may be deleted, and the entry related to the content 906 may not be deleted from the download content list 801. Additionally, even if there is no entity of the content 906 on the SD card 911 when the SD card 911 is inserted to the downloading terminal 903, the viewing time limit synchronization process may be executed if there is an entry in the download content list 801. The process allows obtaining an effect of synchronizing the viewing time limits for the content with the same pack ID as the content 906 when the SD card 911 is inserted to the downloading terminal 903 even if the content 906 on the SD card 911 is deleted due to an excess of viewing time limit or the like.

(Second Embodiment)

Operations of the content utilization system according to a second embodiment of the present invention will be described.

The configuration of the content utilization system according to the present second embodiment is the same as the configuration of the content utilization system according to the first embodiment, and the configuration block diagram is as shown in FIG. 1.

In the content utilization system of the present second embodiment, an operation when the SD card is inserted to the downloading terminal 903 and an operation of the license server 902 are different from the first embodiment. Except for processes described in FIGS. 12 and 14, the downloading terminal 903 and the license server 902 execute the same processes as the downloading terminal 903 and the license server 902 in the first embodiment.

Operations of the downloading terminal 903 and the license server 902 when the pack content 906 is written out to the SD card 911 by the downloading terminal 903 and then the SD card 911 is inserted again to the downloading terminal 903 will be described.

FIG. 12 is a flow chart explaining a viewing time limit synchronization process in the downloading terminal 903 when the SD card 911 is inserted to the downloading terminal 903 in the present second embodiment.

The downloading terminal 903 executes the viewing time limit synchronization process in accordance with the flow shown in FIG. 12 when the SD card 911 is inserted.

The process from step S881 to step S885 is the same as the process of the first embodiment shown in FIG. 11.

After setting the viewing time limit of the content CB with the same pack ID on the storage medium 915 (step S885), the control unit 916 of the downloading terminal 903 uses the network IF 904 to transmit a viewing time limit determination notification 810 including the content ID 705 and the viewing time limit 704 (viewing time limit start and viewing time limit end) of the content CB to the license server 902 (step S887). The control unit 916 then causes the viewing license state setting unit 917 to set the valid/invalid flag 808 of the content CB to "valid".

FIG. 13 is a schematic diagram showing a format of the viewing time limit determination notification 810 according to the present second embodiment.

The viewing time limit determination notification 810 transmitted from the downloading terminal 903 to the license server 902 includes at least the content ID 705 and the viewing time limit 704 (viewing time limit start and the viewing time limit end).

Figure 14:
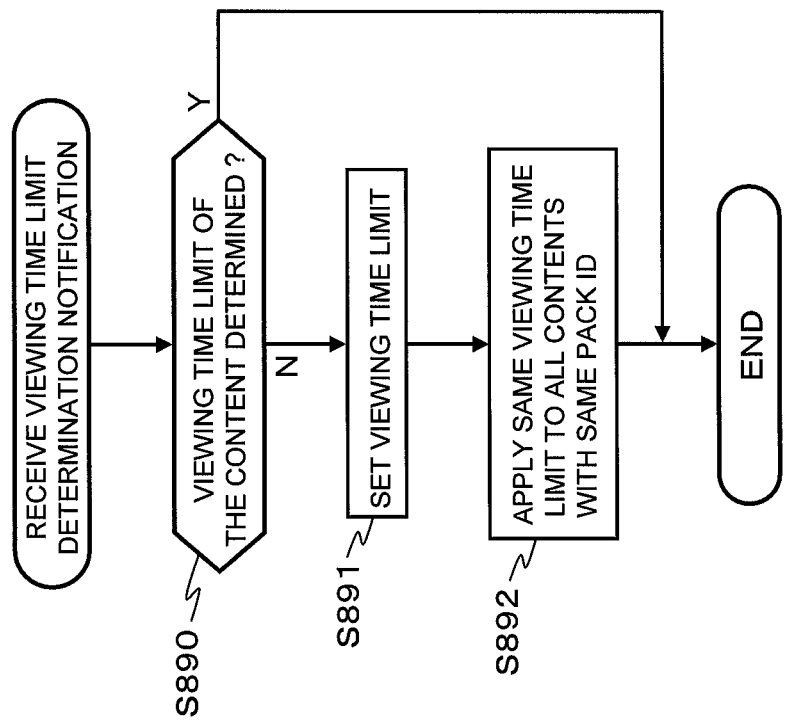
FIG. 14 is a flow chart showing a process in the license server when the viewing time limit determination notification is received according to the second embodiment of the present invention.

FIG. 14 is a flow chart of the viewing time limit synchronization process of the license server 902 when the viewing time limit determination notification 810 has reached the license server 902 from the downloading terminal 903 according to the present second embodiment.

When the request reception unit 912 receives the viewing time limit determination notification 810 from the downloading terminal 903, the viewing time limit setting/determining unit 914 checks whether the viewing time limit of the content is determined from the history information (not shown) of the license server based on the content ID 705 (step S890).

If the viewing time limit of the content is not determined, the viewing time limit 704 included in the viewing time limit determination notification 810 is extracted to set the viewing time limit 704 as the viewing time limit for the content (step S891), and the same viewing time limit is also determined for all contents with the same pack ID as that of the content (step S892).

As described, in the present second embodiment, when the pack content 906 without a determined viewing time limit is written out to the SD card 911, the content 905 in the downloading terminal 903 with the same pack ID as the content 906 is set to the viewing disabled state. When the SD card 911 is inserted again to the downloading terminal 903, the viewing time limit is set to the content 905 with the same pack ID as that of the content 906 with determined viewing time limit on the SD card 911, and the license server 902 is notified of the determination of the viewing time limit of the pack content 905 to cancel the viewing disabled state. In this way, the viewing time limit based on the time of initial viewing of one of the pack contents is set for the pack contents 905 and 906 separately saved in the downloading terminal 903 and the SD card 911, and the time limit synchronization of the pack contents can also be secured for newly downloaded contents.

In the present second embodiment, when the control unit 916 of the downloading terminal 903 sets the viewing time limit of the content CB with the same pack ID on the storage medium 915 (step S885), the viewing time limit determination notification 810 is transmitted to the license server 902 (step S887). However, the viewing time limit determination notification 810 may not be transmitted if all contents with the same pack ID are downloaded, and the viewing time limit determination notification 810 may be transmitted only when there is a content that is not downloaded yet among the pack contents with the same pack ID.

In the present second embodiment, the license server 902 that has received the viewing time limit determination notification 810 from the downloading terminal 903 may transmit an error notification including the content ID 705 of the content and the viewing time limit held by the license server to the downloading terminal 903 if the viewing term of the content is already determined and the viewing time limit held by the license server and the notified viewing time limit do not match.

If the error notification including the viewing time limit is received from the license server 902, the downloading terminal 903 may similarly set the viewing time limit included in the error notification to the content with the content ID 705 included in the error notification.

In the present second embodiment, the viewing time limit notification shown in FIG. 13 is just an example, and the notification does not prescribe the notation and configuration of the content of the notification.

As described, the use of the content utilization system of the present invention is advantageous in that the viewing time limit synchronization with pack contents left on a content receiver can be realized even for the pack contents partially written out on an exchangeable medium and in that pack rental contents can be viewed even in a content reproducer without a function of communication with a license server.

(Third Embodiment)

Although the time limit synchronization of the dispersed contents in the pack contents has been described in the first and second embodiments, the viewing time limit of the content in the downloading terminal 903 and the viewing time limit of the content on the SD card 911 can be synchronized not only for the pack. The synchronization is also possible by a similar method in a case in which viewable rental content is left in the downloading terminal 903, and the rental content is copied to the SD card 911.

A method of synchronizing the viewing time limit of the rental content left in the downloading terminal 903 with the viewing time limit of the content of the rental content copied and written out to the SD card 911 in the content utilization system described in the first embodiment will be described in a third embodiment of the present invention.

The configuration of the content utilization system of the present third embodiment is the same as the configuration of the content utilization system of the first embodiment, and the configuration is as shown in the block diagram of FIG. 1. The basic operations of the blocks shown in FIG. 1 are the same as the operations of the blocks of the first embodiment.

In the present third embodiment, the same formats as in the first embodiment shown in FIGS. 2 to 4 will be used to describe the viewing licenses, the writing licenses, and the download content list.

In the present third embodiment, the content 905 in FIG. 1 is single rental content not provided with the pack ID 714. The content 906 is content copied and written out to the SD card 911 from the content 905, the content 905 is left in the downloading terminal 903, and the content 906 is written out to the SD card 911 in the description. The content 905 and the content 906 are the same contents, and the viewing time limits of the contents need to be set to the same date and time.

The content 906 in the present third embodiment is an example of copied content of the present invention. The content 905 is an example of stored content of the present invention.

The contents indicated by entry numbers 2 to 4 of FIG. 3 are pack contents provided with the pack ID 714, and the content of the entry number 1 is a single content not provided with the pack ID 714. The single content, such as the entry number 1, will be targeted and described in the present third embodiment.

The flow chart of the viewing license registration process when the downloading terminal 903 of the present third embodiment acquires the viewing license of the content 905 stored in the storage medium 915 is as shown in FIG. 5.

Figure 15:
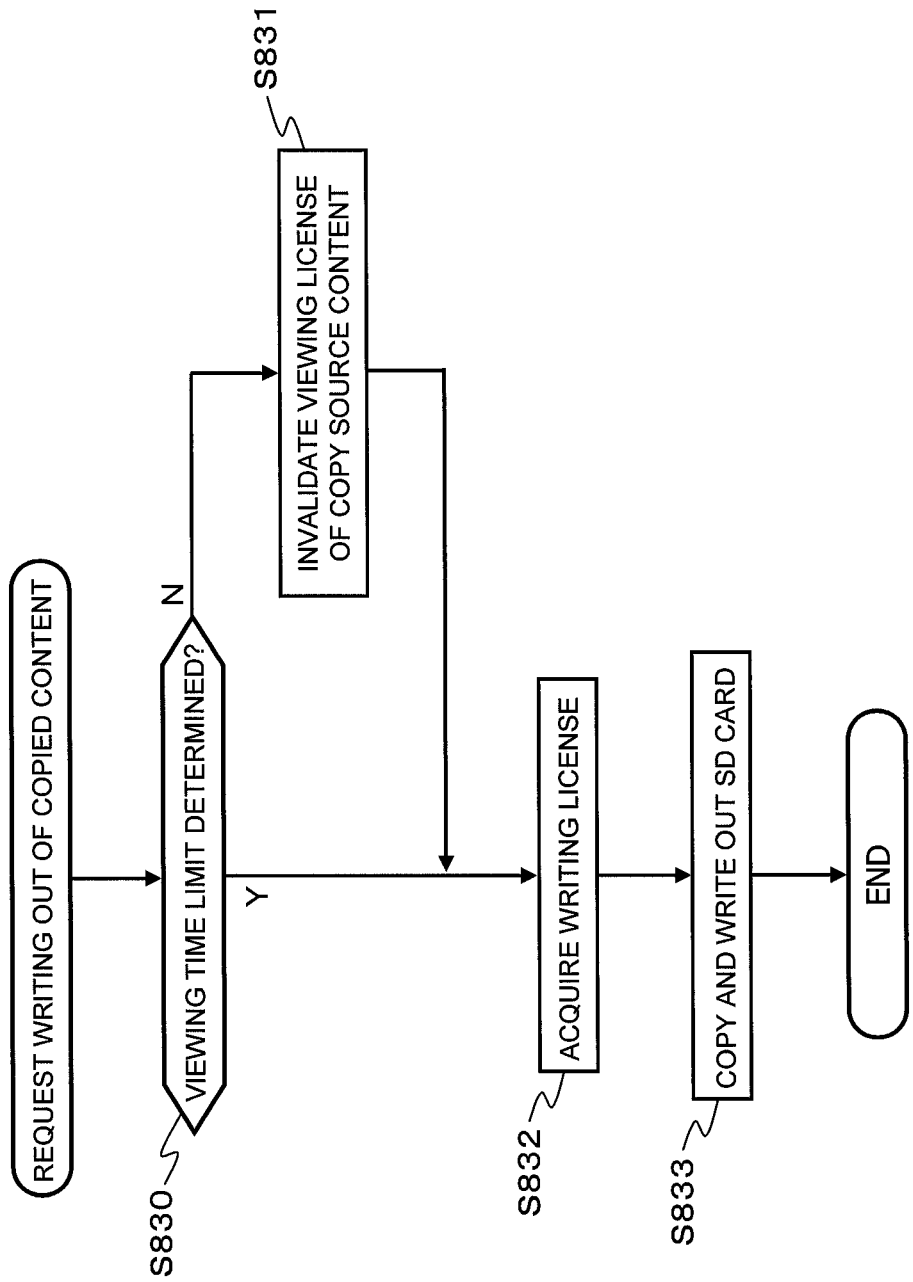
FIG. 15 is a flow chart of a process in the downloading terminal for copying and writing out the content to the SD card according to a third embodiment of the present invention.

FIG. 15 is a flow chart of a writing process when the downloading terminal 903 of the present third embodiment copies and writes out the content 905 stored in the storage medium 915 to the SD card 911 while leaving the content 905 in the downloading terminal 903.

In the present third embodiment, the flow chart of the viewing start process when the content 905 stored in the storage medium 915 is reproduced by the downloading terminal 903 is as shown in FIG. 7.

In the present third embodiment, the flow chart of the viewing start process when the viewing terminal 960 views the copied content 906 recorded in the SD card 911 is as shown in FIG. 8.

The flow chart of the viewing license providing process in the license server 902 of the present third embodiment is as shown in FIG. 9.

The flow chart of the writing license providing process in the license server 902 of the present third embodiment is as shown in FIG. 10.

Figure 16:
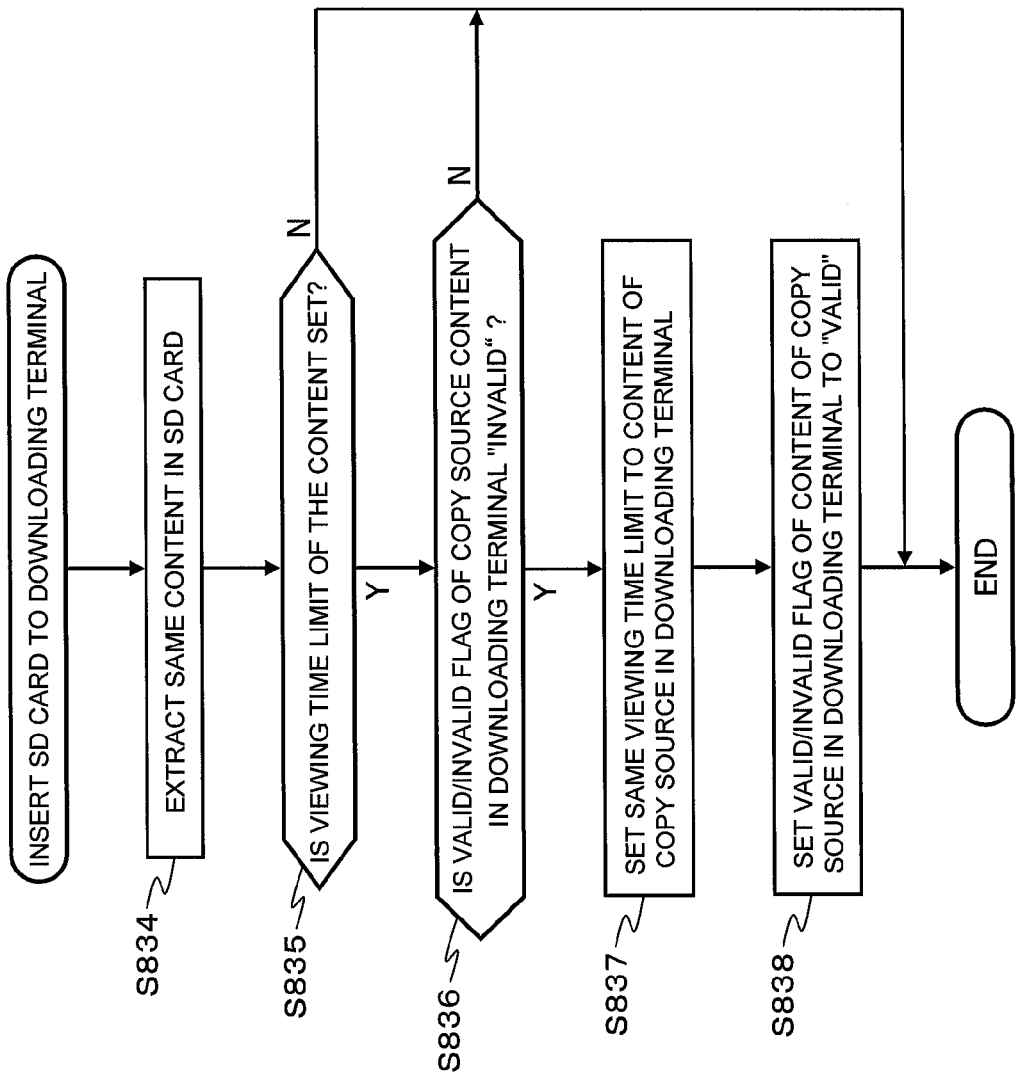
FIG. 16 is a flow chart of a viewing time limit synchronization process in the downloading terminal when the SD card is inserted according to the third embodiment of the present invention.
Figure 17:
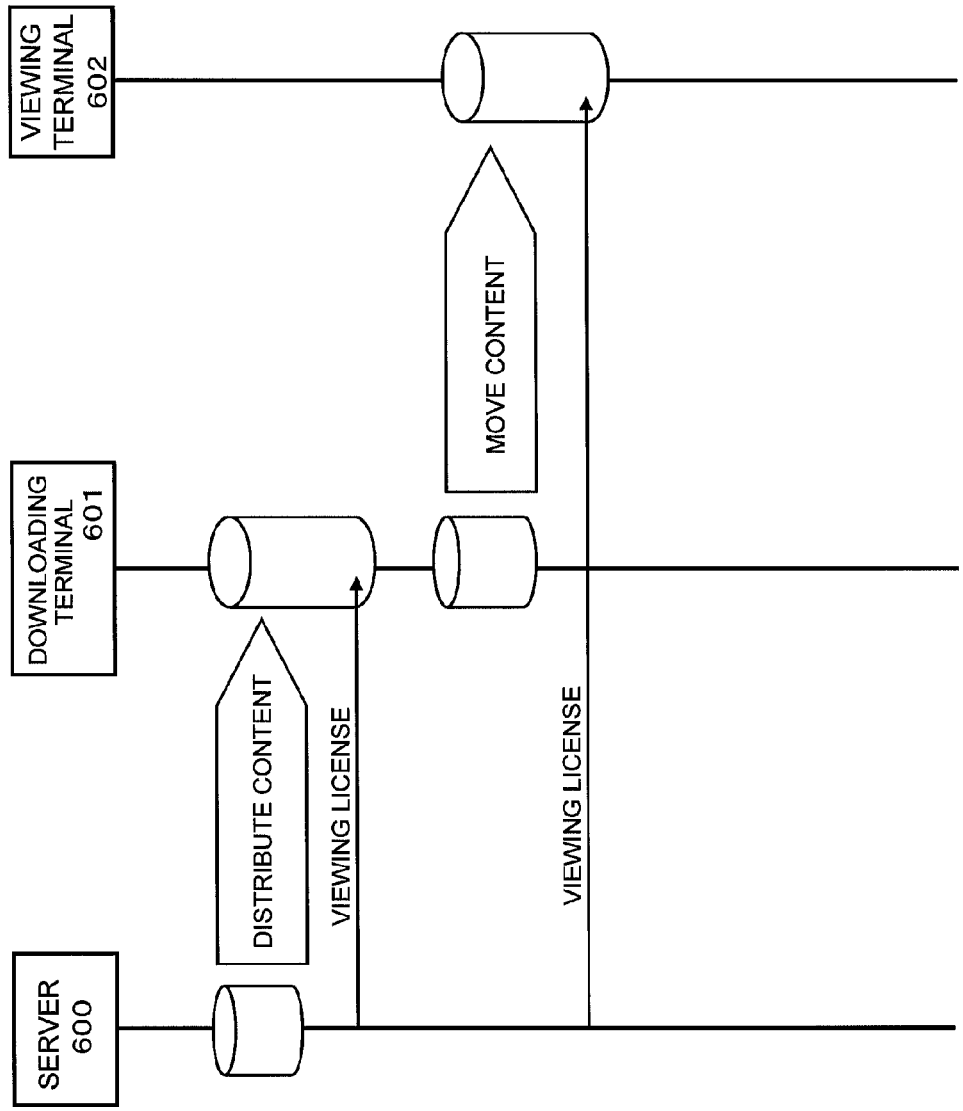
FIG. 17 is a sequence diagram showing movement of content between terminals in conventional content downloading.

FIG. 16 is a flow chart of a viewing time limit synchronization process when the SD card 911 is inserted to the downloading terminal 903 in the present third embodiment.

Hereinafter, an operation of writing out the copied content 906 to the SD card 911 after reproduction of the content 905 by the downloading terminal 903 and an operation of writing out the copied content 906 to the SD card 911 before the reproduction of the content 905 will be sequentially described.

First, the operation when the copied content 906 is written out to the SD card 911 after the reproduction of the content 905 by the downloading terminal 903 will be described.

In the downloading terminal 903, the registration process of the viewing license of the content 905 is executed in accordance with the flow of FIG. 5 as in the first embodiment when, for example, the download of the encoded content 905 is completed.

The valid/invalid flag 808 of the content 905 is set to "valid" in the registration process of the viewing license of the content 5905 (step S823).

To reproduce the content 905 downloaded from the content server 901 and stored in the storage medium 915 in the downloading terminal 903 before the content 905 is copied and written out to the SD card 911, the control unit 916 of the downloading terminal 903 controls the reproduction of the content in accordance with the flow shown in FIG. 7.

When a reproduction instruction for the content 905 downloaded and stored in the storage medium 915 is received from the user (not shown), the control unit 916 first causes the viewing license state setting unit 917 to search the download content list 800 to check the setting of the valid/invalid flag 808 (step S861). In this case, since the copied content 906 is not written out to the SD card 911, the valid/invalid flag 808 is set to "valid" in step S823 of FIG. 5 and is not changed, and the following process of step S863 is executed.

The control unit 916 then causes the viewing time limit setting unit 918 to search the download content list 800 to check whether the viewing time limit of the content 905 is determined (step S863). In this case, this is the first viewing of the content 905, and the viewing time limit is not determined. Therefore, the following process of step S864 is executed.

The control unit 916 uses the network IF 904 to acquire the viewing license 700 with viewing time limit of the content 905 from the license server 902 (step S864) and causes the viewing time limit setting unit 918 to write, in the areas of the download content list 800, the values of the viewing time limit start and the viewing time limit end set as the viewing time limit 704 described in the acquired viewing license 700 with viewing time limit.

Since the content 905 is single content that is not pack content, the process of step S865 is skipped.

Since a valid value, which includes the current time set as the viewing time limit start by the license server 902, is set to the viewing time limit 704 of the viewing license 700 with viewing time limit acquired in step S864, the control unit 916 causes the reproduction unit 907 to use the viewing license to decode and reproduce the content 905 (step S868).

In step S864, the determination operation of the viewing time limit in the license server 902 that has received the request of the viewing license with viewing time limit transmitted by the downloading terminal 903 is the same as in the first embodiment, and the operation is performed in accordance with the flow shown in FIG. 9.

In this case, since the target content 905 has not yet been reproduced by the downloading terminal 903, the reception is judged to be the first reception in step S840. Since the viewing time limit of the target content 905 is not determined yet (step S844), the viewing time limit setting/determining unit 914 sets the current time to the viewing time limit start time in step S841 and adds the viewing term to the viewing time limit start time to calculate the viewing time limit end time to determine the viewing time limit of the content.

In this case, the target content 905, for which the viewing license with viewing time limit is requested, is not pack content, and the process of step S842 is skipped in FIG. 9.

The license transmission unit 913 then returns the viewing license 700 with viewing time limit including the determined viewing time limit 704 to the downloading terminal 903 (step S843).

If the viewing time limit of the target content 905 is already determined in step S844, in other words, if the request of the viewing license with viewing time limit for the content 905 has been received before, the viewing license 700 with viewing time limit including the determined viewing time limit 704 determined at that point is returned to the downloading terminal 903 (step S843).

When the copied content 906 is written out to the SD card 911 after the reproduction of the content 905 by the downloading terminal 903, the control unit 916 of the downloading terminal 903 controls writing out by the SD card reading/writing unit 910 in accordance with the flow shown in FIG. 15.

When the writing request instruction of the copied content is received from the user (not shown), the control unit 916 first judges whether the viewing time limit of the content 905 of the copy source is determined (step S830). The control unit 916 causes the viewing time limit setting unit 918 to judge whether the viewing time limit is determined based on the information of the viewing term 703 and the viewing time limit 704 of the download content list 800. In this case, since the content 905 of the copy source has been reproduced by the downloading terminal 903, the viewing time limit is determined in step S864 of FIG. 7, and the control unit 916 uses the network IF 904 to acquire the writing license from the license server 902 (step S832).

The control unit 916 then causes the SD card reading/writing unit 910 to use the writing license to write out the copied content 906 to the SD card 911 (step S833). At this point, the values of the download content list 800 are copied to the areas of the download content list 801 written out to the SD card 911.

The process of writing out the copied content 906 to the SD card 911 in step S833 may be a process of temporarily creating the content 906 by copying the content 905 in the downloading terminal 903 and then moving the content 906 to the SD card 911. The content 905 may be directly copied to the SD card 911 to write out the content 906 to the SD card 911 without creating the content 906 in the downloading terminal 903.

To view the content 906 written out to the SD card 911 by the downloading terminal 903 in the viewing terminal 960, the viewing terminal 960 controls the reproduction of the content 906 on the SD card 911 in accordance with the flow shown in FIG. 8 as in the first embodiment.

When the reproduction of the content 906 recorded in the SD card 911 is instructed by an instruction from the user (not shown), the reproduction control unit 923 first causes the time limit determination unit 921 to judge whether the viewing time limit of the target content is determined (step S871). The time limit determination unit 921 reads the download content list 801 recorded in the SD card 911 by the SD card reading/writing unit 920 to judge whether the viewing time limit is determined based on the information of the viewing term 703 and the viewing time limit 704 of the target content 906.

In this case, the viewing time limit is determined as the content 905 of the copy source is reproduced by the downloading terminal 903 (step S864). Therefore, the time limit determination unit 921 refers to the download content list 801 to judge whether the viewing time limit is over (step S874). The reproduction control unit 923 deletes the content 906 if the time limit determination unit 921 judges that the viewing time limit is already over (step S875) and starts decoding and reproducing the content 906 if the viewing time limit is not over (step S876).

In this way, if the copied content 906 is written out to the SD card 911 after the reproduction of the content 905 by the downloading terminal 903, the viewing time limit of the content 905 is determined upon the reproduction by the downloading terminal 903 (step S864). Therefore, the viewing time limit of the content 906 copied and written out subsequently to the SD card 911 can be synchronized.

An operation of writing out the copied content 906 of the content 905 to the SD card 911 when the content 905 of the copy source has never been reproduced by the downloading terminal 903 will be described.

The control unit 916 of the downloading terminal 903 controls writing out in accordance with the flow shown in FIG. 15 to write out the copied content 906 of the content 905 to the SD card 911 when the content 905 has never been reproduced by the downloading terminal 903 after download from the content server 901 and storage in the storage medium 915.

When a writing request instruction of the copied content is received from the user (not shown), the control unit 916 judges whether the viewing time limit of the content 905 of the copy source is determined (step S830). In this case, since the content 905 of the copy source has never been reproduced in the downloading terminal 903, the viewing time limit is not determined. Therefore, the following process of step S831 is executed.

The control unit 916 causes the viewing license state setting unit 917 to set the valid/invalid flag 808 of the copy source content 905 to "invalid" in the download content list 800 (step S831).

The control unit 916 then transmits, to the license server 902, a request for the writing license for copying and writing out the content 905 to acquire the writing license from the license server 902 (step S832) and uses the writing license to control copying and writing out to the SD card 911.

In this case, the content 905 has never been reproduced, and the viewing time limit is not determined. Therefore, the writing license 712 with viewing term is received in step S832.

In step S832 of FIG. 15, the operation of the license server 902 when the downloading terminal 903 requests the license server 902 for the writing license is the same as in the first embodiment, and the license server 902 executes the providing process of the writing license in accordance with the flow of FIG. 10.

When the request reception unit 912 receives the request of the writing license from the downloading terminal 903, the viewing time limit setting/determining unit 914 searches whether the viewing time limit of the content is already determined from the history information (not shown) of the license server (step S845). The license transmission unit 913 returns the writing license 710 with viewing time limit including the determined viewing time limit to the downloading terminal 903 if the viewing time limit of the content is already determined (step S846) and returns the writing license 712 with viewing term without a determined viewing time limit to the downloading terminal 903 if the viewing time limit is not determined (step S847).

In the following description, it is assumed that the writing license acquired in step S832 is the writing license 712 with viewing term. In other words, it is assumed that the content 906 written out to the SD card 911 is written out without a determined viewing time limit.

The control unit 916 first checks the setting of the valid/invalid flag 808 of the reproduction target content 905 in accordance with the flow of FIG. 7 to reproduce the content 905 of the copy source stored in the storage medium 915 by the downloading terminal 903 after writing out of the copied content 906 to the SD card 911 (step S861).

Since the valid/invalid flag 808 of the reproduction target content 905 is set to "invalid" in step S831 and is not changed, the control unit 916 ends the process without permitting the reproduction of the reproduction target content 905 (step S862).

The content 906 written out to the SD card 911 by the downloading terminal 903 is viewed on the viewing terminal 960.

The viewing terminal 960 controls the reproduction of the content 906 on the SD card 911 in accordance with the flow shown in FIG. 8.

When the reproduction of the content 906 recorded in the SD card 911 is instructed by an instruction from the user (not shown), the reproduction control unit 923 first causes the time limit determination unit 921 to refer to the field of the content of the download content list 801 to judge whether the viewing time limit of the content 906 is determined (step S871).

In this case, since the target content 906 is written out to the SD card 911 without a determined viewing time limit, it is judged in step S871 that the viewing time limit is not determined.

Since the viewing time limit of the content 906 is not determined, the time limit determination unit 921 acquires the current time from the clock 922 to set the current time to the viewing time limit start time, adds the viewing term 703 to the viewing time limit start time to calculate the viewing time limit end time to determine the viewing time limit 704, and writes the values in the download content list 801 (step S872).

The content 906 is not pack content, and the pack ID 714 is not provided. Therefore, the process of step S873 is skipped.

The reproduction control unit 923 then uses the decryption key 702 described in the download content list 801 to start decoding and reproducing the content 906 (step S876).

An operation of the downloading terminal 903 when the SD card 911 is inserted to the downloading terminal 903 after the reproduction of the content 906 written out to the SD card 911 by the viewing terminal 960 will be described.

When the SD card 911 is inserted, the downloading terminal 903 executes the viewing time limit synchronization process in accordance with the flow shown in FIG. 16.

When a notification of the insertion of the SD card 911 is received from the SD card reading/writing unit 910, the control unit 916 causes the viewing time limit setting unit 918 to search the download content list 801 on the SD card 911 to extract content with the same content ID 705 as the content stored in the storage medium 915 (step S834). In this case, the content 906 that is the same content as the content 905 stored in the storage medium 915 is extracted.

The control unit 916 then causes the viewing time limit setting unit 918 to search the download content list 801 to check whether the viewing time limit of the extracted content 906 is determined (step S835). In this case, the viewing time limit of the content 906 is determined and set in the step S872 when the content 906 on the SD card 911 is reproduced in the viewing terminal 960.

The control unit 916 then causes the viewing license state setting unit 917 to check the state of the valid/invalid flag 808 of the content 905 of the copy source that is the same content as the content 906 (step S836).

If the valid/invalid flag 808 of the content 905 of the copy source is "invalid", the control unit 916 causes the viewing time limit setting unit 918 to set the viewing time limit set to the content 906 as the viewing time limit of the content 905 (to write the viewing time limit in the download content list 800) (step S837). The control unit 916 then causes the viewing license state setting unit 917 to change the valid/invalid flag 808 of the content 905 to "valid" (step S838).

In this way, when the copied content 906 of the content 905 of the copy source is written out to the SD card 911 without being reproduced by the downloading terminal 903, the reproduction of the content 905 of the copy source in the downloading terminal 903 is prohibited if the SD card 911 is not installed, and the same viewing time limit as the copied content 906 on the SD card 911 is set to permit the reproduction when the SD card 911 is installed. Therefore, the viewing time limits of the same contents 905 and 906 on the downloading terminal 903 and on the SD card 911 can be synchronized.

In this way, when the content without a determined viewing time limit is copied and written out to the SD card, the content of the copy source in the downloading terminal is set to the viewing disabled state, and the same viewing time limit as the copied content with a determined viewing time limit is set to the content of the copy source to cancel the viewing disabled state when the SD card is inserted to the downloading terminal. In this way, the viewing time limit is set to the same contents separately stored in the downloading terminal and the SD card based on the time when one of the contents is first viewed. Therefore, the time limit synchronization of the copy source and the copied content can be secured.

The configurations of the modified examples described in the first embodiment may also be applied to the configuration of the present third embodiment.

For example, in the description above, when an attempt is made to reproduce the content 905 in the storage medium 915 after the copied content 906 without a determined viewing time limit is written out to the SD card 911, the valid/invalid flag 808 of the content 905 is set to "invalid". However, if the SD card 911 including the written out copied content 906 is inserted to the downloading terminal 903, the valid/invalid flag 808 of the content 905 of the copy source may be changed to "valid" to advance the process to step S863 of FIG. 7 even if the content 906 is not reproduced yet and the viewing time limit is not determined. As a result of the start of the reproduction of the content 905, the viewing time limit of the content 905 is determined, and the determined same date and time are set to the viewing time limit of the copied content 906 on the SD card 911. The viewing time limits of the contents 905 and 906 are synchronized.

Furthermore, for example, although the available state of the license is set and checked based on the valid/invalid flag 808 in the description above, the viewing license may be temporarily deleted when the license is not available, instead of using the valid/invalid flag 808. In this case, the viewing license is acquired again from the license server 902 to validate the temporarily discarded viewing license. The decryption key 702 included in the viewing license 700 with viewing time limit acquired again is used to decode and reproduce the content.

Although the configurations of the present invention can be realized by hardware, a CPU may execute programs to realize the configurations by software.

Particularly, a change or an addition of license information, a change or an addition of a license format, and the like can be more easily handled if the configurations of the control unit 916, the viewing license state setting unit 917, the viewing time limit setting unit 918, and the like are realized by software.

Moreover, the program of the present invention is a program for causing a computer to execute the operations of the content writing step, when the content receiver writes out the content to the exchangeable medium before the content is reproduced, of also writing out the viewing license of the content to the exchangeable medium, and invalidating a viewing license of related content belonging to a same predetermined content group as the content if the viewing time limit of the content is not determined, and the viewing time limit synchronization step, when the exchangeable medium is installed on the content receiver after the reproduction of the content by the content reproducer, of setting a viewing time limit of the related content to the same time limit as the viewing time limit of the content and validating the viewing license of the related content, of the above-described viewing time limit determination method of the present invention and is a program which operates in cooperation with the computer.

Moreover, the recording medium of the present invention is a recording medium having recorded thereon a program for causing a computer to execute the content writing step, when the content receiver writes out the content to the exchangeable medium before the content is reproduced, of also writing out the viewing license of the content to the exchangeable medium, and invalidating a viewing license of related content belonging to a same predetermined content group as the content if the viewing time limit of the content is not determined, and the viewing time limit synchronization step, when the exchangeable medium is installed on the content receiver after the reproduction of the content by the content reproducer, of setting a viewing time limit of the related content to the same time limit as the viewing time limit of the content and validating the viewing license of the related content, of the above-described viewing time limit determination method of the present invention and is a computer-readable recording medium, the program of which, when read, is used in cooperation with the computer.

Moreover, the program of the present invention is a program for causing a computer to execute the operations of the content writing step, when the content receiver copying the stored content to the exchangeable medium before the stored content is reproduced, of also writing out the viewing license of the copied content to the exchangeable medium, and further invalidating a viewing license of the stored content if the viewing time limit of the copied content is not determined, and the viewing time limit synchronization step, when the exchangeable medium is installed on the content receiver after the reproduction of the copied content by the content reproducer, of setting a viewing time limit of the stored content to the same time limit as the viewing time limit of the copied content and validating the viewing license of the stored content, of the above-described viewing time limit determination method of the present invention and is a program which operates in cooperation with the computer.

Moreover, the recording medium of the present invention is a recording medium having recorded thereon a program for causing a computer to execute the content writing step, when the content receiver copying the stored content to the exchangeable medium before the stored content is reproduced, of also writing out the viewing license of the copied content to the exchangeable medium, and further invalidating a viewing license of the stored content if the viewing time limit of the copied content is not determined, and the viewing time limit synchronization step, when the exchangeable medium is installed on the content receiver after the reproduction of the copied content by the content reproducer, of setting a viewing time limit of the stored content to the same time limit as the viewing time limit of the copied content and validating the viewing license of the stored content, of the above-described viewing time limit determination method of the present invention and is a computer-readable recording medium, the program of which, when read, is used in cooperation with the computer.

Moreover, the above-mentioned "operation of the step" of the present invention means the operation of all or a part of the step.

Moreover, in one use form of the program according to the present invention, the program may be recorded in the recording medium such as ROM readable by the computer, and operated in cooperation with the computer.

Moreover, in another use form of the program according to the present invention, the program may be transmitted across the network such as the Internet, or through the transmission media such as light, electric wave or sound wave, read by the computer and operated in cooperation with the computer.

Industrial Applicability

The content receiver, the content utilization system, the viewing time limit determination method, and the like according to the present invention have an effect of enabling of synchronizing viewing time limits of a plurality of contents even if some of the plurality of contents that need to have the same viewing time limits are written out to an exchangeable medium before the viewing time limits are determined and are useful as a content receiver, a content utilization system, a viewing time limit determination method and the like for copying and bringing out encoded content with managed viewing time limit from a content receiver to an exchangeable medium and for reproducing the encoded content by a reproducer.

REFERENCE SIGNS LIST

600 server
601 downloading terminal
602 viewing terminal
605 HDD
606 SD card
700 viewing license with viewing time limit
701 viewing license with viewing term
702 decryption key
703 viewing term
704 viewing time limit
705 content ID
710 writing license with viewing time limit
711 media type
712 writing license with viewing term
713 license type
714 pack ID
800 download content list
801 download content list
808 valid/invalid flag
810 viewing time limit determination notification
901 content server
902 license server
903 downloading terminal
904 network IF
905 content
906 content
907 reproduction unit
908 decoder
910 SD card reading/writing unit
911 SD card
912 request reception unit
913 license transmission unit
914 viewing time limit setting/determining unit
915 storage medium
916 control unit
917 viewing license state setting unit
918 viewing time limit setting unit
919 clock
920 SD card reading/writing unit
921 time limit determination unit
922 clock
923 reproduction control unit
924 decoder
960 viewing terminal

The invention claimed is:

1. A content receiver that receives content with a viewing license accompanied by a viewing time limit managed from a content server and that writes out the content along with the viewing license of the content to an exchangeable medium, the content receiver comprising:
a license invalidating/validating unit that invalidates and validates the viewing license;
an exchangeable medium reading/writing unit that writes out the content along with the viewing license of the content to the exchangeable medium and that reads at least the viewing license written in the exchangeable medium;
a viewing time limit setting unit that sets the viewing time limit; and
a control unit, wherein when the control unit causes the exchangeable medium reading/writing unit to write out the content to the exchangeable medium before the content is reproduced, the control unit causes the exchangeable medium reading/writing unit to also write out the viewing license of the content to the exchangeable medium, and further causes the license invalidating/validating unit to invalidate the viewing license of related content belonging to a predetermined content group to which the content to be written out belongs if the viewing time limit of the content is not set, and when the exchangeable medium with the viewing license of the content being written thereto, which is accompanied by the viewing time limit that has been set by reproducing of the content written out to the exchangeable medium, is installed, the control unit causes the viewing time limit setting unit to set the viewing time limit, which is the same as the viewing time limit of the reproduced content, for the related content and causes the license invalidating/validating unit to validate the viewing license of the related content.

2. The content receiver according to claim 1, further comprising a transmission/reception unit that transmits and receives data to and from a license server that supplies the viewing license, wherein the control unit causes the transmission/reception unit to notify the license server of the set viewing time limit when the viewing time limit setting unit sets the viewing time limit of the related content.

3. The content receiver according to claim 2, wherein the control unit causes the transmission/reception unit to notify the license server of the set viewing time limit only if there is content belonging to the predetermined content group, that is not yet downloaded from the content server.

4. The content receiver according to claim 1, wherein, when the related content is reproduced while the exchangeable medium with the viewing license of the content being written thereto without a determined viewing time limit is installed, the control unit causes the license invalidating/validating unit to validate the viewing license of the related content and causes the viewing time limit setting unit to determine the viewing time limit of the related content and to set the viewing time limit of the content recorded in the exchangeable medium to the same time limit as the determined viewing time limit of the related content.

5. The content receiver according to claim 1, wherein
the invalidation of the viewing license of the related content without a set viewing time limit by the license invalidating/validating unit, denotes a discard of the viewing license of the related content, and
the license invalidating/validating unit acquires the viewing license of the related content again from a license server when the control unit validates the discarded viewing license of the related content.

6. A content utilization system comprising:
a content receiver that receives content with a viewing license accompanied by a viewing time limit managed from a content server and that writes out the content along with the viewing license of the content to an exchangeable medium; and
a content reproducer that reproduces the content recorded in the exchangeable medium,
wherein content receiver comprises:
a license invalidating/validating unit that invalidates and validates the viewing license;
an exchangeable medium reading/writing unit that writes out the content along with the viewing license of the content to the exchangeable medium and that reads at least the viewing license written in the exchangeable medium;
a viewing time limit setting unit that sets the viewing time limit; and
a control unit, wherein when the control unit causes the exchangeable medium reading/writing unit to write out the content to the exchangeable medium before the content is reproduced, the control unit causes the exchangeable medium reading/writing unit to also write out the viewing license of the content to the exchangeable medium, and further causes the license invalidating/validating unit to invalidate the viewing license of related content belonging to a predetermined content group to which the content to be written out belongs if the viewing time limit of the content is not set, wherein the content reproducer comprises:
a viewing time limit determination unit that sets a current time to a start time to set the viewing time limit of the content if the viewing time limit of the content is not set when the content recorded in the exchangeable medium is reproduced; and
a viewing license writing unit that records the viewing license of the content accompanied by the set viewing time limit to the exchangeable medium, and
wherein, when the exchangeable medium is installed on the content receiver after the reproduction of the content recorded in the exchangeable medium by the content reproducer, the control unit causes the viewing time limit setting unit to set the viewing time limit, which is the same as the viewing time limit of the reproduced content, for the related content and causes the license invalidating/validating unit to validate the viewing license of the related content.

7. A viewing time limit determination method of content of a content utilization system, the content utilization system comprising: a content receiver that receives content with a viewing license accompanied by a viewing time limit managed from a content server and that writes out the content along with the viewing license of the content to an exchangeable medium; and a content reproducer that reproduces the content recorded in the exchangeable medium, the viewing time limit determination method comprising:

a content writing step, when the content receiver writes out the content along with the viewing license of the content to the exchangeable medium, of invalidating the viewing license of related content belonging to a predetermined content group to which the content to be written out belongs if the viewing time limit of the content is not set;
a viewing time limit determination step, when the content reproducer reproduces the content recorded in the exchangeable medium, of setting the viewing time limit of the content by setting a current time to a start time if the viewing time limit of the content is not set, and recording the viewing license of the content accompanied by the set viewing time limit to the exchangeable medium; and
a viewing time limit synchronization step, when the exchangeable medium is installed on the content receiver after the reproduction of the content by the content reproducer, of setting the viewing time limit, which is the same as the viewing time limit of the reproduced content, for the related content and validating the viewing license of the related content.

8. A program embodied on a non-transitory computer-readable medium, the program causing a computer to execute the viewing time limit determination method according to claim 7.

9. A content receiver that receives content with a viewing license accompanied by a viewing time limit managed from a content server, stores the content, and copies the content to an exchangeable medium, the content receiver comprising:
a license invalidating/validating unit that invalidates and validates the viewing license of the stored content;
an exchangeable medium reading/writing unit that copies the stored content to the exchangeable medium, writes out the viewing license of the copied content on the exchangeable medium, to the exchangeable medium, and reads at least the viewing license written in the exchangeable medium;
a viewing time limit setting unit that sets the viewing time limit; and
a control unit, wherein
when the control unit causes the exchangeable medium reading/writing unit to copy the stored content to the exchangeable medium before the stored content is reproduced, the control unit causes the exchangeable medium reading/writing unit to also write out the viewing license of the copied content to the exchangeable medium, and further causes the license invalidating/validating unit to invalidate the viewing license of the stored content if the viewing time limit of the copied content is not set, and
when the exchangeable medium with the viewing license of the copied content being written thereto, which is accompanied by the viewing time limit that has been set by reproducing of the copied content written out to the exchangeable medium, is installed, the control unit causes the viewing time limit setting unit to set the viewing time limit of the stored content, which is the same as the viewing time limit of the reproduced content, for the stored content and causes the license invalidating/validating unit to validate the viewing license of the stored content.

10. The content receiver according to claim 9, wherein, when the stored content is reproduced while the exchangeable medium with the viewing license of the copied content being written thereto without a determined viewing time limit is installed, the control unit causes the license invalidating/validating unit to validate the viewing license of the stored content and causes the viewing time limit setting unit to determine the viewing time limit of the stored content and to set the viewing time limit of the copied content to the same time limit as the determined viewing time limit.

11. The content receiver according to claim 9, wherein
the invalidation of the viewing license of the stored content without a set viewing time limit by the license invalidating/validating unit, denotes a discard of the viewing license of the stored content, and
the license invalidating/validating unit acquires the viewing license of the stored content again from a license server when the control unit validates the discarded viewing license of the stored content.

12. A content utilization system comprising:
a content receiver that receives content with a viewing license accompanied by a viewing time limit managed, from a content server, stores the content along with the viewing license of the content, and copies the content along with the viewing license of the content to an exchangeable medium; and
a content reproducer that reproduces the copied content recorded in the exchangeable medium,
wherein the content receiver comprises:
a license invalidating/validating unit that invalidates and validates the viewing license of the stored content;
an exchangeable medium reading/writing unit that copies the stored content to the exchangeable medium, writes out also the viewing license of the copied content on the exchangeable medium to the exchangeable medium, and reads at least the viewing license written in the exchangeable medium;
a viewing time limit setting unit that sets the viewing time limit; and
a control unit,
wherein, when the control unit causes the exchangeable medium reading/writing unit to copy the stored content to the exchangeable medium before the stored content is reproduced, the control unit causes the exchangeable medium reading/writing unit to also write out the viewing license of the copied content to the exchangeable medium, and further causes the license invalidating/validating unit to invalidate the viewing license of the stored content if the viewing time limit of the copied content is not set,
wherein the content reproducer comprises:
a viewing time limit determination unit that sets a current time to a start time to set the viewing time limit of the copied content if the viewing time limit of the copied content is not set when the copied content recorded in the exchangeable medium is reproduced; and
a viewing license writing unit that records the viewing license of the copied content accompanied by the set viewing time limit to the exchangeable medium, and
wherein, when the exchangeable medium is installed on the content receiver after the reproduction of the copied content recorded in the exchangeable medium by the content reproducer, the control unit causes the viewing time limit setting unit to set the viewing time limit, which is the same as the viewing time limit of the reproduced content, for the stored content and causes the license invalidating/validating unit to validate the viewing license of the stored content.

13. A viewing time limit determination method of content of a content utilization system, the content utilization system comprising: a content receiver that receives content with a viewing license accompanied by a viewing time limit managed from a content server, stores the content, and copies the content along with the viewing license of the content to an exchangeable medium; and a content reproducer that reproduces the copied content recorded in the exchangeable medium, the viewing time limit determination method comprising:
a content writing step, when the content receiver copies the stored content along with the viewing license of the copied content to the exchangeable medium before the stored content is reproduced, of invalidating the viewing license of the stored content if the viewing time limit of the copied content is not set;
a viewing time limit determination step, when the content reproducer reproduces the copied content recorded in the exchangeable medium, of setting the viewing time limit of the copied content by setting a current time to a start time if the viewing time limit of the copied content is not set, and recording the viewing license of the copied content accompanied by the set viewing time limit to the exchangeable medium; and a viewing time limit synchronization step, when the exchangeable medium is installed on the content receiver after the reproduction of the copied content by the content reproducer, of setting the viewing time limit, which is the same as the viewing time limit of the reproduced content, for the stored content and validating the viewing license of the stored content.

14. A program embodied on a non-transitory computer-readable medium, the program causing a computer to execute the viewing time limit determination method according to claim 13.

* * * * *